(12) United States Patent
Marinier et al.

(10) Patent No.: US 9,136,990 B2
(45) Date of Patent: Sep. 15, 2015

(54) METHOD AND APPARATUS FOR MULTIPLE CARRIER UTILIZATION IN WIRELESS COMMUNICATIONS

(71) Applicant: INTERDITIGAL PATENT HOLDINGS, INC., Wilmington, DE (US)

(72) Inventors: Paul Marinier, Brossard (CA); Diana Pani, Montreal (CA); Benoit Pelletier, Roxboro (CA); Fengjun Xi, Huntington Station, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 143 days.

(21) Appl. No.: 13/774,332

(22) Filed: Feb. 22, 2013

(65) Prior Publication Data

US 2013/0163550 A1 Jun. 27, 2013

Related U.S. Application Data

(63) Continuation of application No. 12/622,793, filed on Nov. 20, 2009, now abandoned.

(60) Provisional application No. 61/116,887, filed on Nov. 21, 2008, provisional application No. 61/141,470, filed on Dec. 30, 2008.

(51) Int. Cl.
*H04B 1/00* (2006.01)
*H04B 7/00* (2006.01)
(Continued)

(52) U.S. Cl.
CPC ............ *H04L 5/00* (2013.01); *H04L 5/0098* (2013.01); *H04W 72/04* (2013.01); *H04L 5/001* (2013.01); *H04W 76/025* (2013.01); *H04W 76/048* (2013.01); *H04W 76/064* (2013.01)

(58) Field of Classification Search
CPC . H04L 5/0098; H04W 76/048; H04W 76/064
See application file for complete search history.

(56) References Cited

U.S. PATENT DOCUMENTS

| 7,724,639 B1 * | 5/2010 | Porat et al. ................... 370/208 |
| 2002/0164986 A1 | 11/2002 | Briand et al. |

(Continued)

FOREIGN PATENT DOCUMENTS

| CN | 101127556 A | 2/2008 |
| EP | 1292061 A1 | 3/2003 |
| JP | 2011-528212 A | 11/2011 |

OTHER PUBLICATIONS

3rd Generation Partnership Project (3GPP), R1-081545, "Consideratins on Dual-Cell HSDPA Operation", Ericsson, 3GPP TSG RAN WG1 Meeting #52bis, Shenzhen, China, Mar. 31-Apr. 4, 2008, 2 pages.

(Continued)

*Primary Examiner* — Ayodeji Ayotunde
(74) *Attorney, Agent, or Firm* — Condo Roccia Koptiw LLP

(57) ABSTRACT

Methods and apparatus for multiple carrier utilization in wireless communications are disclosed. These methods include multiple carrier activation/deactivation, multiple carrier discontinuous transmission (DTX) and discontinuous reception (DRX) activation/deactivation and operations, and multiple carrier acknowledgment/negative acknowledgement feedback. The methods include provisions for joint multiple carrier activation and deactivation and joint DTX and DRX activation and deactivation of multiple carriers.

16 Claims, 8 Drawing Sheets

(51) Int. Cl.
*H04L 5/00* (2006.01)
*H04W 72/04* (2009.01)
*H04W 4/00* (2009.01)
*H04B 1/38* (2015.01)
*H04W 76/02* (2009.01)
*H04W 76/04* (2009.01)
*H04W 76/06* (2009.01)

(56) References Cited

U.S. PATENT DOCUMENTS

| | | | |
|---|---|---|---|
| 2004/0110506 A1* | 6/2004 | Dent | 455/437 |
| 2007/0091817 A1 | 4/2007 | Yoon et al. | |
| 2008/0102880 A1 | 5/2008 | Gholmieh et al. | |
| 2009/0257387 A1 | 10/2009 | Gholmieh et al. | |
| 2009/0316575 A1* | 12/2009 | Gholmieh et al. | 370/225 |
| 2011/0116467 A1 | 5/2011 | Jung et al. | |

OTHER PUBLICATIONS

3rd Generation Partnership Project (3GPP), R1-080904, "HS-SCCH orders for HS-SCCH-less operation", Ericsson, 3GPP TSG RAN WG1 Meeting #52, Sorrento, Italy, Feb. 11-15, 2008, 3 pages.

3rd Generation Partnership Project (3GPP), R1-081114, "Further Refinements on CQI Reporting on PSCH—Sample Text", Texas Instruments, Ericsson, Nortel, Philips, 3GPP TSG RAN WG1 52, Sorrento, Italy, Feb. 11-15, 2008, 3 pages.

3rd Generation Partnership Project (3GPP), R1-082882, "Discussion on activation/deactivation of dual-cell HSDPA", Samsung, 3GPP TSG RAN WG1 Meeting #54, Jeju, Korea, Aug. 18-22, 2008, 2 pages.

3rd Generation Partnership Project (3GPP), R1-083293, "Discussion on activation/deactivation of dual-cell HSDPA", Samsung, 3GPP TSG RAN WG1 Meeting #54, Jeju, Korea, Aug. 18-22, 2008, 7 pages.

3rd Generation Partnership Project (3GPP), R1-083396, "Introduction of Dual-Cell HSDPA Operation on Adjacent Carriers", Ericsson, Huawei, Nokia, Nokia Siemens Networks, Philips, Qualcomm Europe, Samsung, Change Request, 25.212 CR 0267, rev 1, Current version: 8.2.0, 3GPP TSG-RAN WG1 Meeting #54, Jeju, Korea, Aug. 18-22, 2008, 3 pages.

3rd Generation Partnership Project (3GPP), R1-084030, "Introduction of Dual-Cell HSDPA Operation on Adjacent Carriers", Ericsson, Huawei, Nokia, Nokia Siemens Networks, Philips, Qualcomm Europe, Samsung, Change Request 25.212 CR 0267, rev 3, Current version: 8.3.0, 3GPP TSG-RAN WG1 Meeting #54bis, Prague, Cz, Sep. 29-Oct. 3, 2008, 101 pages.

3rd Generation Partnership Project (3GPP), R1-084031, "Introduction of Dual-Cell HSDPA Operation on Adjacent Carriers", Ericsson, Huawei, Nokia, Nokia Siemens Networks, Philips, Qualcomm Europe, Samsung, Change Request 25.214 CR 0497, rev 4, Current version: 8.3.0, 3GPP TSG-RAN WG1 Meeting #54bis, Prague, Cz, Sep. 29-Oct. 3, 2008, 85 pages.

3rd Generation Partnership Project (3GPP), R1-084690, "Introduction of Dual-Cell HSDPA Operation on Adjacent Carriers", Huawei, Change Request, 25.212 CR 0267, rev 5, Current version: 8.3.0, 3GPP TSG-RAN WG1 Meeting #54bis, Prague, Czech Republic, Sep. 29-Oct. 3, 2008, 101 pages.

3rd Generation Partnership Project (3GPP), R1-091858, "HS-SCCH Orders for Secondary Carrier Activation/De-Activation in DC-HSUPA", Qualcomm Europe, 3GPP TSG-RAN WG1 #57, San Francisco, USA, May 4-8, 2009, 5 pages.

3rd Generation Partnership Project (3GPP), RP-080148, "Feasibility Study on Dual-Cell HSDPA operation", 3GPP TSG RAN #39, Puerto Vallarta, Mexico, Mar. 4-7, 2008, 4 pages.

3rd Generation Partnership Project (3GPP), TS 25.211 V8.2.0, "3rd Generation Partnership Project; Technical Specification Group Radio Access Network; Physical Channels and Mapping of Transport Channels Onto Physical Channels (FOD) (Release 8)", Sep. 2008, 56 pages.

3rd Generation Partnership Project (3GPP), TS 25.211 V8.5.0, "3rd Generation Partnership Project (3GPP); Technical Specification Group Radio Access Network; Physical channels and mapping of transport channels onto physical channels (FDD) (Release 8)", Sep. 2009, 56 pages.

3rd Generation Partnership Project (3GPP), TS 25.211 V9.0.0, "3rd Generation Partnership Project; Technical Specification Group Radio Access Network; Physical channels and mapping of transport channels onto physical channels (FDD) (Release 9)", Sep. 2009, 56 pages.

3rd Generation Partnership Project (3GPP), TS 25.212 V8.3.0, "3rd Generation Partnership Project; Technical Specification Group Radio Access Network; Multiplexing and channel coding (FDD) (Release 8)", Sep. 2008, 104 pages.

3rd Generation Partnership Project (3GPP), TS 25.212 V8.6.0, "3rd Generation Partnership Project; Technical Specification Group Radio Access Network; Multiplexing and channel coding (FDD) (Release 8)", Sep. 2009, 107 pages.

3rd Generation Partnership Project (3GPP), TS 25.212 V9.0.0, "3rd Generation Partnership Project; Technical Specification Group Radio Access Network; Multiplexing and channel coding (FDD) (Release 9)", Sep. 2009, 108 pages.

3rd Generation Partnership Project (3GPP), TD 25.214 V8.3.0, "3rd Generation Partnership Project; Technical Specification Group Radio Access Network; Physical Layer Procedures (FDD) (Release 7)", Sep. 2008, 89 pages.

3rd Generation Partnership Project (3GPP), TS 25.214 V8.7.0, "3rd Generation Partnership Project; Technical Specification Group Radio Access Network; Physical Layer Procedures (FDD) (Release 7)", Sep. 2009, 93 pages.

3rd Generation Partnership Project (3GPP), TS 25.214 V9.0.0, "3rd Generation Partnership Project; Technical Specification Group Radio Access Network; Physical layer procedures (FDD) (Release 9)", Sep. 2009, 95 pages.

3rd Generation Partnership Project (3GPP), TS 25.308 V8.3.0, "3rd Generation Partnership Project; Technical Specification Group Radio Access Network; High Speed Downlink Packet Access (HSDPA); Overall Description; Stage 2 (Release 8)", Sep. 2008, 56 pages.

3rd Generation Partnership Project (3GPP), TS 25.308 V8.7.0, "3rd Generation Partnership Project; Technical Specification Group Radio Access Network; High Speed Downlink Packet Access (HSDPA); Overall description; Stage 2 (Release 8)", Sep. 2009, 65 pages.

3rd Generation Partnership Project (3GPP), TS 25.308 V9.1.0, "3rd Generation Partnership Project; Technical Specification Group Radio Access Network; High Speed Downlink Packet Access (HSDPA); Overall description; Stage 2 (Release 9)", Sep. 2009, 65 pages.

* cited by examiner

METHOD AND APPARATUS FOR MULTIPLE CARRIER UTILIZATION IN WIRELESS COMMUNICATIONS

CROSS REFERENCE TO RELATED APPLICATIONS

This application is a continuation of U.S. patent application Ser. No. 12/622,793 filed Nov. 20, 2009; which claims the benefit of U.S. provisional application Nos. 61/116,887, filed on Nov. 21, 2008 and 61/141,470, filed Dec. 30, 2008, which are incorporated by reference as if fully set forth.

FIELD OF INVENTION

This application is related to wireless communications.

BACKGROUND

Wireless communication systems keep evolving to meet the needs for providing continuous and faster access to data networks. This evolution is driven by the desire for mobile users to be connected from anywhere at anytime to other users or information networks, for business, leisure or other purposes. In order to meet these needs, wireless communication systems may use multiple carriers for the transmission of data. A wireless communication system that uses multiple carriers for the transmission of data may be referred to as a multi-carrier system. The use of multiple carriers is expanding in both cellular and non-cellular wireless systems. A multi-carrier system may increase the bandwidth available in a wireless communication system according to a multiple of how many carriers are made available. For instance, dual carrier systems may double the bandwidth as a single carrier system and tri-carrier systems may triple the bandwidth as a single carrier system, etc. In addition to this throughput gain, diversity and joint scheduling gains may also be expected. This may result in improving the quality of service (QoS) for end users. Further, the use of multiple carriers may be used in combination with multiple-output (MIMO).

By way of example, in the context of Third Generation Partnership Project (3GPP) systems, a new feature called dual cell high speed downlink packet access (DC-HSDPA) has been introduced in Release 8 of the 3GPP specifications. In DC-HSDPA, the same geographical area is covered by up to two HSDPA, possibly adjacent, carriers in the same band. The use of frequency diversity between carriers in the same band in a DC-HSDPA system improves system performance. With DC-HSDPA, a base station (which may also be referred to as a Node-B, an access point, site controller, etc. in other variations or types of communications networks) communicates to a wireless transmit/receive unit (WTRU) over two downlink carriers simultaneously. This not only doubles the bandwidth and the peak data rate available to WTRUs, but also has a potential to increase the network efficiency by means of fast scheduling and fast channel feedback over two carriers.

SUMMARY

Methods and an apparatus for multiple carrier utilization in wireless communications are disclosed. These methods include multiple carrier activation/deactivation, multiple carrier discontinuous transmission (DTX) and discontinuous reception (DRX) activation/deactivation and operations, and multiple carrier acknowledgment/negative acknowledgement feedback. The methods include provisions for joint multiple carrier activation and deactivation and joint DTX and DRX activation and deactivation for multiple carriers. A method for activating/deactivating multiple carriers includes receiving an activation/deactivation message, where the activation/deactivation message includes activation/deactivation command information and carrier information. At least one carrier from the multiple carriers is determined from the activation/deactivation message and is acted upon with respect to the activation/deactivation message.

BRIEF DESCRIPTION OF THE DRAWINGS

A more detailed understanding may be had from the following description, given by way of example in conjunction with the accompanying drawings wherein.

DETAILED DESCRIPTION

Figure 1:
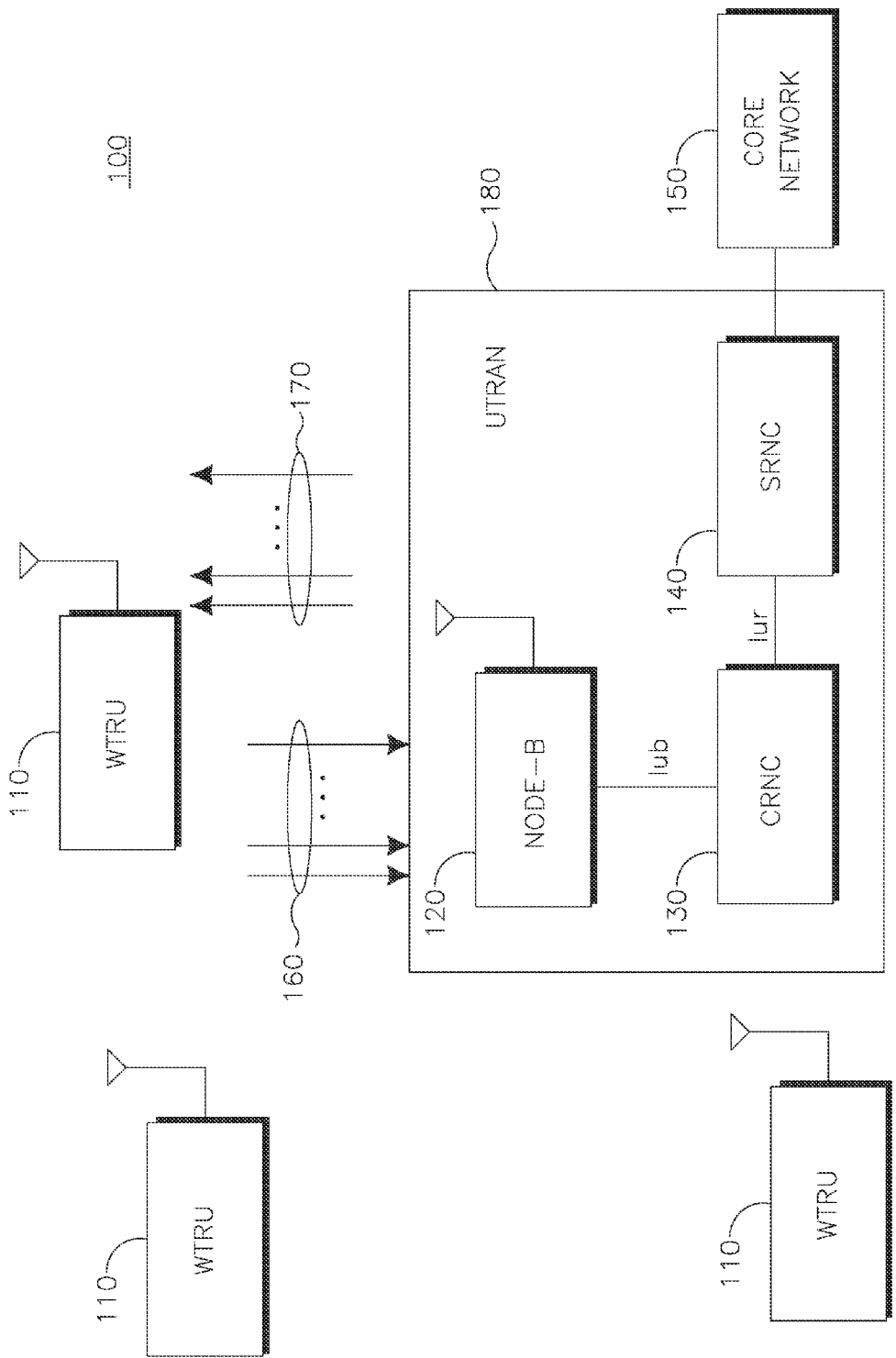
FIG. 1 shows an example wireless communication system wherein uplink transmissions are handled using multiple uplink carriers.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "Node-B" includes but is not limited to a base station, a site controller, an access point (AP), or any other type of interfacing device capable of operating in a wireless environment.

In general, the network may assign at least one downlink (DL) and/or at least one uplink (UL) carrier as an anchor downlink carrier and an anchor uplink carrier, respectively. In multi-carrier operation, a WTRU may be configured to operate with two or more carriers or also referred to as frequencies. Each of these carriers may have distinct characteristics and logical associations with the network and the WTRU, and the operating frequencies may be grouped and referred to as anchor or primary carrier and supplementary or secondary carrier. If more than two carriers are configured, the WTRU may contain more than one primary carrier and/or more than one secondary carrier(s). For example, the anchor carrier may be defined as the carrier for carrying a specific set of control information for downlink/uplink transmissions. Any carrier that is not assigned as an anchor carrier may be a supplementary carrier. Alternatively, the network may not assign an anchor carrier and no priority, preference, or default status may be given to any downlink or uplink carriers. Hereinafter, the terms "anchor carrier", "primary carrier", "uplink carrier 1", "first carrier", "first uplink carrier" and "primary uplink frequency", are used interchangeably herein for convenience. Similarly, the terms "supplementary carrier", "secondary carrier", "uplink carrier 2", "second carrier", "second uplink carrier" and "secondary uplink frequency" are also used interchangeably herein.

As part of dual cell high speed packet access (DC-HSPA), which also includes dual cell high speed downlink packet access (DC-HSDPA) and high speed uplink packet access (DC_HSUPA), the following definitions/terminology/assumptions have been introduced and may be used throughout this disclosure without limiting the scope of the disclosure. First, a sector is one or more cells belonging to the same base station and covering the same geographical area. Second, the two carriers have the same time reference and their downlinks are synchronized. Next, the terminology "anchor carrier" refers to the downlink frequency carrier associated with an uplink frequency carrier assigned to the WTRU, and the terminology "supplementary carrier" refers to the downlink frequency carrier which is not the anchor carrier. The uplink "anchor" carrier refers to the uplink carrier associated with the downlink anchor carrier either via explicit configuration or by implicit association via the specific uplink/downlink carrier spacing.

In some embodiments, multiple uplink and downlink carriers may be configured for the WTRU. The multiple carriers may or may not be adjacent and may or may not be on the same frequency or radio band and/or range of frequencies. In one embodiment, the multiple carriers may include, but are not limited to, any of the following: four downlink carriers adjacent in the same band with one or two uplink carriers in the same band; two pairs of two adjacent downlink carriers over two different bands and two uplink carriers in the respective bands; or three adjacent downlink carriers in the same band with one or two (adjacent) uplink carriers also in the same band.

The term downlink "anchor" carrier may refer to the downlink carrier carrying downlink control channels such as, but not limited to, a fractional dedicated physical channel (F-DPCH), an enhanced-absolute grant channel (E-AGCH) and others. Other physical channels such as the common pilot channel (CPICH), high-speed shared control channel (HS-SCCH) and high-speed physical downlink shared channel (HS-PDSCH) may be read from any downlink carrier, such as the supplementary or secondary carriers. When more than one downlink carrier carries downlink control channels associated with one or more uplink carriers, the downlink "anchor" carrier may refer to a downlink carrier configured with an "anchor" carrier attribute. Alternatively, the term downlink "anchor" carrier may refer to the downlink carrier on which a serving HS-DSCH cell is transmitted. Optionally, if a single downlink carrier is configured for the WTRU, then it is the primary downlink carrier.

The following notation may be used throughout. The terms DLn and ULn may respectively refer to the $n^{th}$ secondary serving high-speed downlink shared channel (HS-DSCH) cell (secondary DL carrier) and the $n^{th}$ secondary serving enhanced dedicated channel (E-DCH) cell (secondary UL carrier) for n>0. The terms DL0 and UL0 may respectively refer to the primary serving HS-DSCH cell (primary DL carrier) and the primary serving E-DCH cell (primary UL carrier).

In some embodiments, UL carriers may be paired with DL carriers. DL carriers, on the other hand, may be unpaired (i.e., the number of configured DL carriers may be greater or equal to the number of configured UL carriers). In the case where a DL carrier is paired with an UL carrier, the UL/DL carrier pair may require three different orders to cover transitions between three possible states of the carrier pair, where state 1 may mean both the UL and DL carriers are activated, state 2 may mean both the UL and DL carriers are deactivated and state 3 may mean the DL carrier is activated and UL carrier is deactivated.

In alternative embodiments, a UL carrier may not be activated if the associated DL carrier is deactivated.

In the case where a DL carrier is not paired (i.e., a DL carrier does not have an associated UL carrier), two different orders are required to cover transitions between the two possible states, where state 1 may mean the DL carrier is activated and state 2 may mean the DL carrier is deactivated.

The embodiments disclosed herein may be used individually or in any combination. Further, the embodiments disclosed herein may be used in combination with the embodiments described in U.S. patent application Ser. No. 12/610,284 entitled "METHOD AND APPARATUS FOR UTILIZING MULTIPLE CARRIERS IN HIGH SPEED PACKET ACCESS COMMUNICATIONS" to Marinier et al, and incorporated by reference herein.

FIG. 1 shows an example wireless communications system 100 according to an example embodiment where uplink transmissions are handled using multiple carriers 160 and downlink transmissions are handled using multiple carriers 170. The wireless communication system 100 includes a plurality of WTRUs 110, a Node-B 120, a controlling radio network controller (CRNC) 130, a serving radio network controller (SRNC) 140, and a core network 150. The Node-B 120, the CRNC 130 and the SRNC 140 may collectively be referred to as the Universal Mobile Telecommunications System (UMTS) Terrestrial Radio Access Network (UTRAN) 180.

As shown in FIG. 1, the WTRUs 110 are in communication with the Node-B 120, which is in communication with the CRNC 130 and the SRNC 140. Although three WTRUs 110, one Node-B 120, one CRNC 130, and one SRNC 140 are shown in FIG. 1, it should be noted that any combination of wireless and wired devices may be included in the wireless communication system 100.

Figure 2:
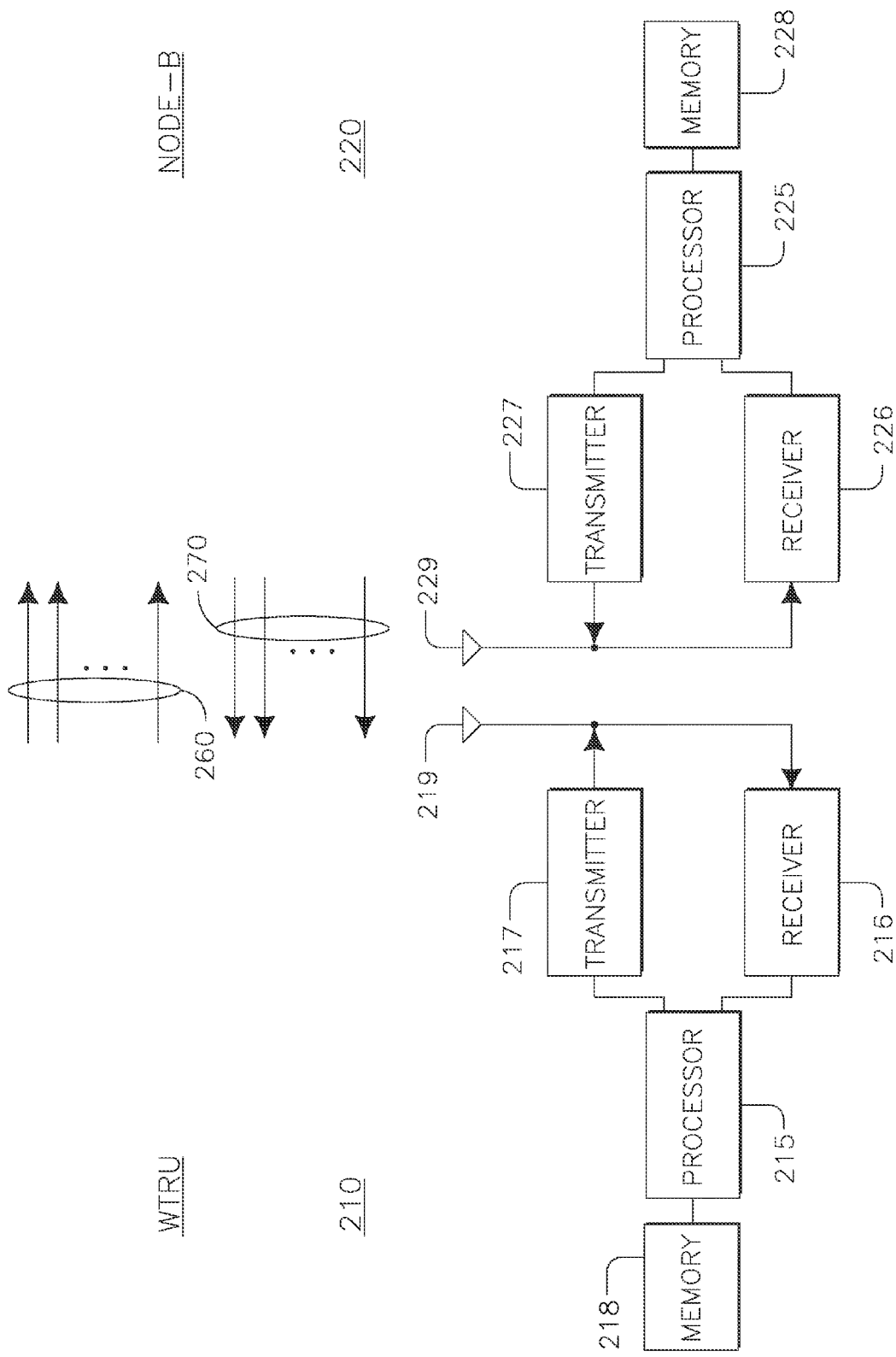
FIG. 2 is a functional block diagram of an example wireless transmit/receive unit (WTRU) and an example Node-B of the wireless communication system of FIG. 1.

FIG. 2 shows a functional block diagram of the WTRU 210 and the Node-B 220 of the wireless communication system 100 of FIG. 1. As shown in FIG. 2, the WTRU 210 is in communication with the Node-B 220 and both are configured to perform a method wherein uplink transmissions from the WTRU 210 are transmitted to the Node-B 220 using multiple uplink carriers 260, and downlink transmissions from the Node-B 220 are transmitted to the WTRU 210 using multiple downlink carriers 270.

The WTRU 210 includes a processor 215, a receiver 216, a transmitter 217, a memory 218, an antenna 219, and other components (not shown) that may be found in a typical WTRU. The antenna 219 may include a plurality of antenna elements or plurality of antennas that may also be included in the WTRU 210. The memory 218 is provided to store software including operating system, application, etc. The processor 215 is provided to perform, alone or in association with software and/or any one or more of the components, a method of performing multiple carrier operations. The receiver 216 and the transmitter 217 are in communication with the processor 215. The receiver 216 and the transmitter 217 are capable of receiving and transmitting one or more carriers simultaneously. Alternatively, multiple receivers and/or multiple transmitters may be included in the WTRU 210. The antenna 219 is in communication with both the receiver 216 and the transmitter 217 to facilitate the transmission and reception of wireless data in a multiple carrier scenario.

The Node-B 220 includes a processor 225, a receiver 226, a transmitter 227, a memory 228, an antenna 229, and other components (not shown) that may be found in a typical base station or Node-B. The antenna 229 may include a plurality of antenna elements or plurality of antennas that may also be included in the Node-B 220. The memory 228 is provided to store software including operating system, application, etc. The processor 225 is provided to perform, alone or in association with software and/or any one or more of the components, a method of performing multiple carrier operations. The receiver 226 and the transmitter 227 are in communication with the processor 225. The receiver 226 and the transmitter 227 are capable of receiving and transmitting one or more carriers simultaneously. Alternatively, multiple receivers and/or multiple transmitters may be included in the Node-B 220. The antenna 229 is in communication with both the receiver 226 and the transmitter 227 to facilitate the transmission and reception of wireless data.

Embodiments disclosed herein provide several approaches for performing multi-carrier activation and deactivation, for performing multi-carrier discontinuous reception (DRX) and discontinuous transmission (DTX) activation and deactivation, for performing multi-carrier DRX and DTX operations, and for implementing acknowledgement/negative acknowledgement feedback for multiple carriers. It is noted that although certain embodiments may be disclosed herein in terms of downlink (uplink) or DRX(DTX) scenarios, it should be understood that the embodiments disclosed herein are applicable to the uplink (downlink) or DTX(DRX) scenarios.

It is also noted that although the embodiments disclosed herein are described with reference to channels associated with 3GPP Releases 4 through 7, the embodiments are also applicable to further 3GPP releases (and the channels used therein) such as LTE Release 8, LTE-Advanced and any other type of wireless communication system (and the channels used therein). It should also be noted that the embodiments described herein may be applicable in any order or in any combination.

Figure 3:
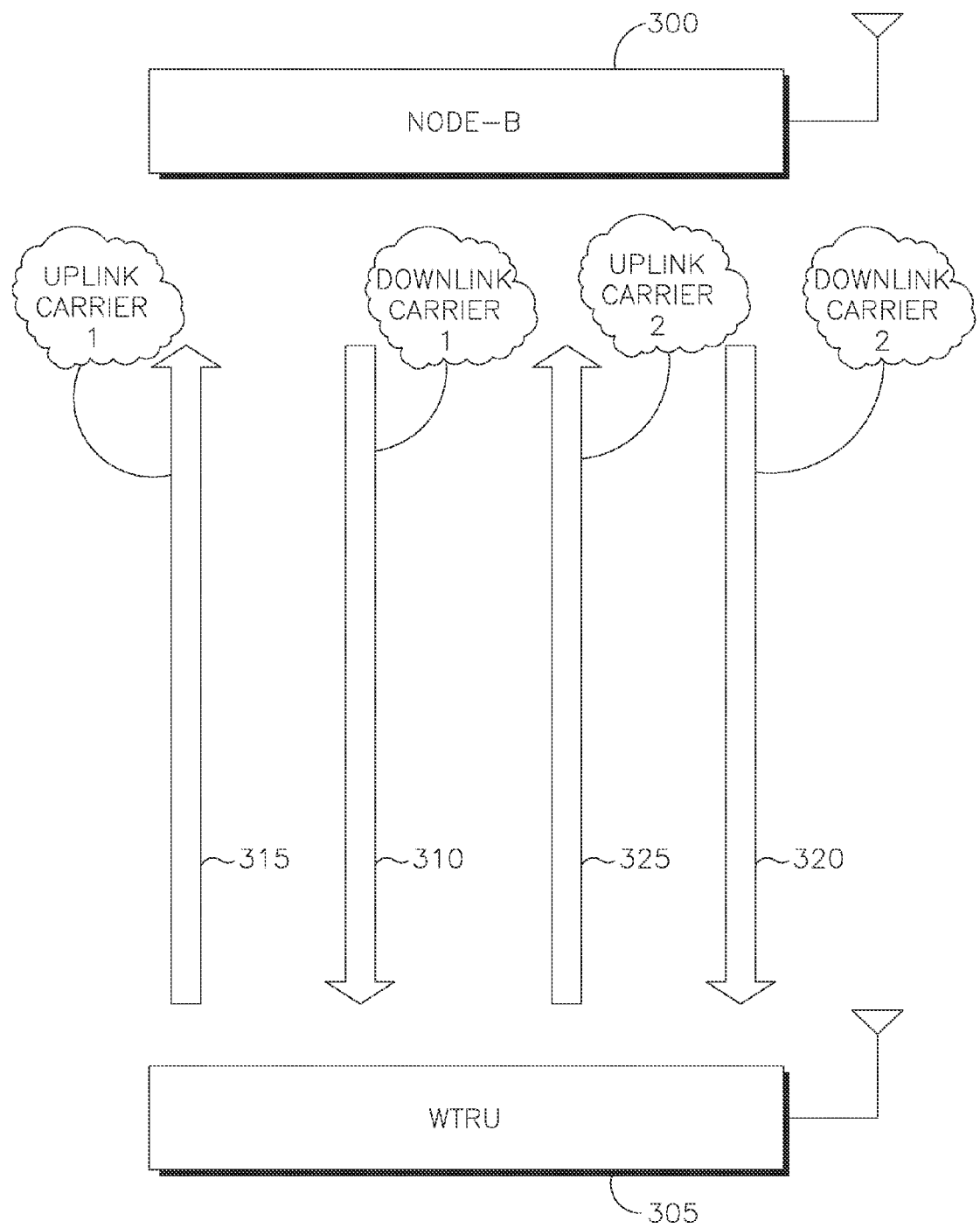
FIG. 3 is a functional block diagram illustrating two uplink carriers and two downlink carriers.
Figure 4:
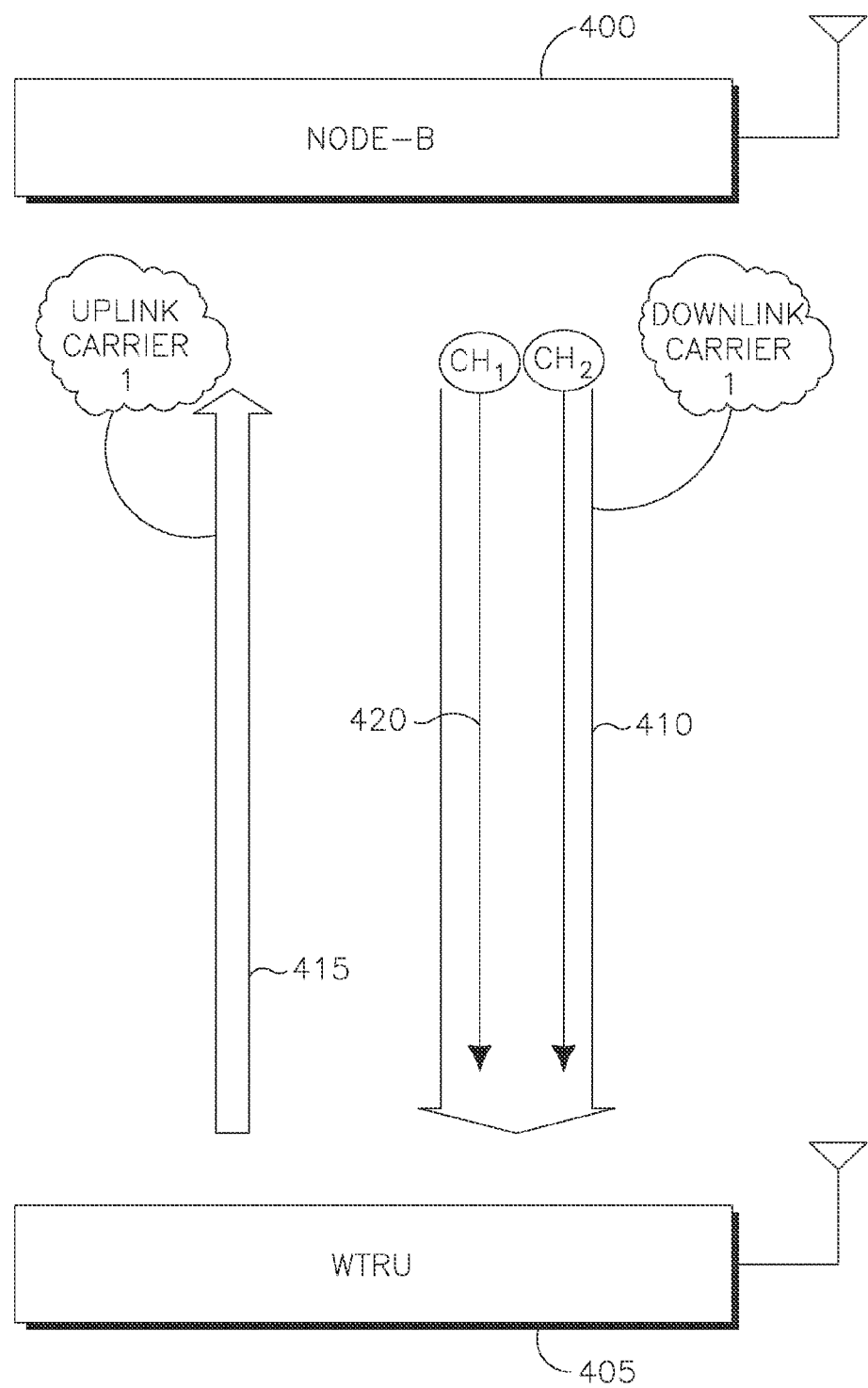
FIG. 4 is a functional block diagram illustrating two channels being carried in a single downlink carrier.

Embodiments to dynamically activate and deactivate supplementary carriers are disclosed. More particularly FIGS. 3 and 4 show embodiments for performing multi-carrier operations. The channels used in FIGS. 3 and 4 show the use of specific channels but it is noted that any channel may be carried in the carriers. Referring now to FIG. 3, in an illustrative wireless communications system, where different carriers cover different geographical areas, a WTRU may be in an area covered by some of its configured HSDPA carriers but not others. For example in FIG. 3, a Node-B 300 and WTRU 305 may have communications coverage via downlink carrier 1 310 and uplink carrier 1 315 but not via downlink carrier 2 320 and uplink carrier 2 325. It may be noted that the embodiments disclosed herein may apply to any multi-carrier system, regardless of the number of radios included in the receiver/transmitter or transceiver.

Disclosed is an embodiment where the UTRAN may be configured to use HS-SCCH orders to control the activation and deactivation of supplementary carriers. Referring to FIG. 4, the HS-SCCH order may be a $CH_1$ 420 carried by a downlink carrier 1 410 from a Node-B 400 to a WTRU 405. In a first example, the HS-SCCH orders control the activation and deactivation of the supplementary carriers on an individual basis. This HS-SCCH order may be configured to carry an indication of which carrier should be activated and deactivated following the order. In an alternative example, the HS-SCCH order may be reserved for the activation and deactivation of all supplementary carriers simultaneously.

The signaling of an HS-SCCH order may be performed using order type bits that are labeled $x_{odt,1}$, $x_{odt,2}$, $x_{odt,3}$ and order bits that are labeled $x_{ord,1}$, $x_{ord,2}$, $x_{ord,3}$.

In a first embodiment, the order type indicates an activation/deactivation order while the order bit indicates the carriers to which the order applies. For example, if the order type $x_{odt,1}$, $x_{odt,2}$, $x_{odt,3}$='010', then the order is an activation order for the supplementary carrier index indicated by $x_{ord,1}$, $x_{ord,2}$, $x_{ord,3}$. If order type $x_{odt,1}$, $x_{odt,2}$, $x_{odt,3}$='011', then the order is a deactivation order for the supplementary carrier index indicated by $x_{ord,1}$, $x_{ord,2}$, $x_{ord,3}$. The other supplementary carriers (not indexed by $x_{ord,1}$, $x_{ord,2}$, $x_{ord,3}$) are not affected by the order. This approach allows the signaling of up to 8 supplementary carriers, but requires two order types. For illustrative purposes only, if an order type $x_{odt,1}$, $x_{odt,2}$, $x_{odt,3}$='010' and order bits $x_{ord,1}$, $x_{ord,2}$, $x_{ord,3}$='111' was received, then the supplementary carrier associated with supplementary carrier index 7 may be activated. Alternatively, if the order type $x_{odt,1}$, $x_{odt,2}$, $x_{odt,3}$='010', then the order is a deactivation order for the supplementary carrier index indicated by $x_{ord,1}$, $x_{ord,2}$, $x_{ord,3}$. If order type $x_{odt,1}$, $x_{odt,2}$, $x_{odt,3}$='011', then the order is an activation order for the supplementary carrier index indicated by $x_{ord,1}$, $x_{ord,2}$, $x_{ord,3}$.

In a second embodiment, dynamic switching or activation/deactivation is executed if the order type $x_{odt,1}$, $x_{odt,2}$, $x_{odt,3}$='010'. The order bits are then examined to determine the proper action and supplementary carrier. If the order bit $x_{ord,1}$=1, then supplementary carrier 1 is activated and if the order bit $x_{ord,1}$=0, then supplementary carrier 1 is deactivated. If the order bit $x_{ord,2}$=1, then supplementary carrier 2 is activated and if the order bit $x_{ord,2}$=0, then the supplementary carrier 2 is deactivated. If the order bit $x_{ord,3}$=1, then supplementary carrier 3 is activated and if the order bit $x_{ord,3}$=0, then supplementary carrier 3 is deactivated. This embodiment uses a single order type and may activate and deactivate up to three supplementary carriers simultaneously.

In another embodiment, the UTRAN transmits an explicit signal for activation or deactivation of a group of carriers simultaneously. For example, a group of carriers may be comprised using any one or a combination of the following methods. In one grouping method, the group may comprise of all supplementary carriers in a given frequency band (for the uplink, downlink or both) where the association between the frequency band and the explicit message may be pre-configured or implicit based on the frequency band over which the explicit message is transmitted. In another grouping method, the group may comprise of all supplementary carriers (uplink, downlink or both). In yet another grouping method, the group may comprise of all downlink supplementary carriers associated with a given downlink anchor carrier (whether in the same frequency band or not). In still another grouping method, the group may comprise of all the carriers (uplink, downlink or both) in a particular frequency band (i.e., deactivate or activate reception of the specified frequency band). In another grouping method, the group may comprise of all non-anchor carriers in the downlink, uplink or both. In another grouping method, the group may comprise of all of the carriers that are part of a group of carriers, where the group of carriers is a pre-defined list of downlink and/or uplink carriers and the list of downlink and/or uplink carriers within a group may be pre-configured through radio resource controller (RRC) signaling upon radio bearer establishment/reconfiguration or pre-configured at the WTRU. In another grouping method, the group may consist of all of the carriers that are part of a group of carriers, where the group of downlink carriers may be defined as all of those carriers for which the WTRU is allocated the same radio network temporary identifier, such as, but not limited to, a high-speed downlink shared channel (HS-DSCH)-RNTI (H-RNTI). The example grouping methods disclosed herein are applicable for all embodiments described herein.

Explicit signaling embodiments are disclosed in general and explained in further detail below. In one embodiment, the explicit signal for activation or deactivation of a group of carriers simultaneously may comprise of a new high speed shared control channel (HS-SCCH) order that is different than an existing order for activation and deactivation of a secondary serving HS-DSCH cell. In another embodiment, the explicit signal may be an existing order for activation and deactivation of secondary serving HS-DSCH cell that is re-interpreted for example when the WTRU is configured for multi-carrier operations to indicate not only activation and deactivation of the secondary serving HS-DSCH cell but of a group of carriers, for example, all supplementary serving HS-DSCH cell carriers. This example order may apply to carriers that are considered "supplementary" in their respective band. For example, the activation/deactivation command may not apply to downlink (DL) carriers that are anchor in a given band.

In another embodiment, the explicit signal may be a L2 or L3 explicit message for activation or deactivation of a group of carriers simultaneously.

For the explicit embodiments disclosed herein, the explicit message may apply to carriers in the band over which it was transmitted.

For the explicit embodiments disclosed herein, the explicit message may apply to supplementary carriers that are associated with the same anchor carrier.

Details for a variety of methods for activation/deactivation of the secondary carriers implemented on a per-carrier or individual or per-paired-carrier (which may be pre-defined or pre-specified or pre-configured) basis are described below. Multiple HS-SCCH orders may be used to simultaneously activate/deactivate multiple carriers.

In one embodiment, existing order types used for indicating the activation/deactivation of the secondary carriers are reused in combination with various order mapping methods to provide an activation/deactivation order and to indicate targeted carrier (or targeted paired-carrier) for which the activation/deactivation order is applicable. For DC-HSPA, for the existing order type $x_{odt,1}$, $x_{odt,2}$, $x_{odt,3}$='001', three bit orders ($x_{ord,1}$, $x_{ord,2}$, $x_{ord,3}$) are used for activation and deactivation of both UL and DL of a first secondary carrier. In this embodiment, various order mapping methods are used in combination with reusing the existing order type ($x_{odt,1}$, $x_{odt,2}$, $x_{odt,3}$)='001' to individually activate/deactivate the targeted secondary carriers for MC-HSPA where there are multiple secondary carriers.

In a first method, a single UL carrier is configured. When a single UL carrier is configured, three bit orders may fully support the activation/deactivation of secondary carriers in MC-HSDPA system with up to four DL carriers. One binary order bit may be used to indicate activation or deactivation of each secondary DL carrier, (order bit '1' and '0' may respectively indicate activation and deactivation or deactivation and activation), and the rest of the order bits may indicate the index of the targeted secondary DL carrier to which the order applies, so the individual activation/deactivation of three secondary DL carriers may only need three order bits. This method may be applied to MC-HSDPA system with up to K DL carriers. The individual activation/deactivation of (K−1) secondary DL, carriers may need N order bits, where N is the integer number such that $N \geq [1+\log_2(K-1)]$. The mapping between the order bits and carriers may be indicated in any order. In one example, different HS-SCCH orders may be sent individually to activate and deactivate each downlink carrier as shown by way of example in Table 1, which represents the HS-SCCH order for activation/deactivation of the secondary carriers in MC-HSDPA with four DL carriers configured. It should be understood that the actual command-to-bit mapping may take a different forms than those shown in Table 1. It should also be understood that this concept also applies when there are less than four DL carriers. In this case, the order associated with activation and deactivation for un-configured carriers is changed to "reserved". This may apply to all embodiments discussed herein. The actual command-to-bit mappings shown below may be applied on a per-carrier or per-group basis.

TABLE 1

| | 4 DL + 1 UL | | | |
|---|---|---|---|---|
| Order Type | Order | | | |
| ($x_{odt,1}$, $x_{odt,2}$, $x_{odt,3}$) | $x_{ord,1}$ | $x_{ord,2}$ | $x_{ord,3}$ | Description of Command |
| 001 | 0 | 0 | 0 | Deactivation of DL1 |
| | 0 | 0 | 1 | Activation of DL1 |
| | 0 | 1 | 0 | Deactivation of DL2 |
| | 0 | 1 | 1 | Activation of DL2 |
| | 1 | 0 | 0 | Deactivation of DL3 |
| | 1 | 0 | 1 | Activation of DL3 |
| | 1 | 1 | 0 | Reserved |
| | 1 | 1 | 1 | Reserved |

In a second method, multiple UL carriers are configured. The following set of embodiments may be for the case where two UL carriers are configured, and where the existing three bits, $x_{ord,1}$, $x_{ord,2}$ and $x_{ord,3}$, may be reinterpreted to achieve supplementary carrier activation/deactivation. Note that the embodiments may also be used when a single UL carrier is configured.

One example embodiment is shown below in Table 2, where each HS-SCCH order may activate/deactivate a single DL carrier or a paired DL/UL carrier which may be indicated by one order bit, and the rest of the order bits may indicate the activation/deactivation order for the targeted carrier or the targeted paired carriers. If $x_{ord,1}$=0, the order is an activation/deactivation order for the paired DL1/UL1 carriers. If $x_{ord,1}$=1, the order is an activation/deactivation order for a single DL carrier (i.e., DL2 or DL3). In other words, in order to activate or deactivate multiple downlink carriers, multiple HS-SCCH orders may be sent by the Node-B. It should be understood that the actual command-to-bit mapping may take a different form than that shown in Table 2, where example HS-SCCH orders are shown for activation/deactivation of the secondary carriers in MC-HSPA.

TABLE 2

| | 4 DL + 2 UL | | | |
|---|---|---|---|---|
| Order Type | Order | | | |
| ($x_{odt,1}$, $x_{odt,2}$, $x_{odt,3}$) | $x_{ord,1}$ | $x_{ord,2}$ | $x_{ord,3}$ | Description of Command |
| 001 | 0 | 0 | 0 | Deactivation of DL1, Deactivation of UL1 |
| | 0 | 0 | 1 | Activation of DL1, Deactivation of UL1 |
| | 0 | 1 | 0 | Reserved |
| | 0 | 1 | 1 | Activation of DL1, Activation of UL1 |
| | 1 | 0 | 0 | Deactivate DL2 |

TABLE 2-continued

4 DL + 2 UL

| Order Type $(x_{odt,1}, x_{odt,2}, x_{odt,3})$ | Order $x_{ord,1}$ | $x_{ord,2}$ | $x_{ord,3}$ | Description of Command |
|---|---|---|---|---|
| | 1 | 0 | 1 | Activate DL2 |
| | 1 | 1 | 0 | Deactivate DL3 |
| | 1 | 1 | 1 | Activate DL3 |

In another example embodiment pre-specified downlink carriers, for example, DL2 and DL3, may be simultaneously activated or deactivated using a single HS-SCCH order, as show in Table 3. In this example, the $x_{ord,2}$ bit is used to indicate activation or deactivation of DL2, whereas the $x_{ord,3}$ bit is used to indicate activation or deactivation of DL3. It should be understood that the actual command-to-bit mapping may take a different form than that shown in Table 3, which shows an example HS-SCCH order for activation/deactivation of the secondary carriers in MC-HSPA.

TABLE 3

4 DL + 2 UL

| Order Type $(x_{odt,1}, x_{odt,2}, x_{odt,3})$ | Order $x_{ord,1}$ | $x_{ord,2}$ | $x_{ord,3}$ | Description of Command |
|---|---|---|---|---|
| 001 | 0 | 0 | 0 | Deactivation of DL1, Deactivation of UL1 |
| | 0 | 0 | 1 | Activation of DL1, Deactivation of UL1 |
| | 0 | 1 | 0 | Reserved |
| | 0 | 1 | 1 | Activation of DL1, Activation of UL1 |
| | 1 | 0 | 0 | Deactivate DL2, Deactivate DL3 |
| | 1 | 0 | 1 | Deactivate DL2, Activate DL3 |
| | 1 | 1 | 0 | Activate DL2, Deactivate DL3 |
| | 1 | 1 | 1 | Activate DL2, Activate DL3 |

Another set of embodiments may be used where as many as four carriers are configured in the UL. Note that the embodiments may also be applied when a single UL carrier is configured.

As part of one embodiment, activation/deactivation of the second and third secondary carrier pairs, i.e. DL2/UL2 and DL3/UL3, may be signaled together. By way of example, HS-SCCH orders "111", "101" and "100" may be used to activate/deactivate UL and DL of second and third secondary carriers simultaneously. One example implementation is shown in Table 4, which shows an example HS-SCCH order for activation/deactivation of the secondary carriers in MC-HSPA. In this embodiment, if $x_{ord,1}=0$, Release 9 DC-HSUPA order mapping may be applied to the first secondary carrier. If $x_{ord,1}=1$, Release 9 DC-HSUPA order mapping may be applied to the second and third secondary carriers together. This embodiment may be applied to the other two combinations, where the first and second secondary carriers are signaled together, or where the first and third secondary carriers are signaled together, without considering the backwards capability to Release 9 DC-HSUPA.

TABLE 4

4 DL + 4 UL

| Order Type $(x_{odt,1}, x_{odt,2}, x_{odt,3})$ | Order $x_{ord,1}$ | $x_{ord,2}$ | $x_{ord,3}$ | Description of Command |
|---|---|---|---|---|
| 001 | 0 | 0 | 0 | Deactivation of DL1, Deactivation of UL1 |
| | 0 | 0 | 1 | Activation of DL1, Deactivation of UL1 |
| | 0 | 1 | 0 | Reserved |
| | 0 | 1 | 1 | Activation of DL1, Activation of UL1 |
| | 1 | 0 | 0 | Deactivation of DL2/DL3, Deactivation of UL2/UL3 |
| | 1 | 0 | 1 | Activation of DL2/DL3, Deactivation of UL2/UL3 |
| | 1 | 1 | 0 | Reserved |
| | 1 | 1 | 1 | Activation of DL2/DL3, Activation of UL2/UL3 |

In an alternate embodiment for 4 DL and 4 UL carrier activation/deactivation, UL/DL carrier pairs are activated/deactivated together for the second and third secondary carriers using a single activate/deactivate command for both UL and DL second carrier and/or a single activate/deactivate command for both the UL and DL third carriers.

In one embodiment, the HS-SCCH number that may be used to send the order implicitly indicates which carrier or group of carriers is targeted. In one illustrative implementation, if (HS-SCCH number) mod 2=0, then the HS-SCCH order is targeted for first secondary carrier only: 011 means activation of both first secondary UL and DL; 001 means activation of first secondary DL and deactivation of secondary UL; and 000 means deactivation of both first secondary UL and DL. If (HS-SCCH number) mod 2=1, then the HS-SCCH order is targeted for second and third carriers—011 means activation of both second secondary UL and DL; 001 means activation of second secondary DL and deactivation of secondary UL; 000 means deactivation of both second secondary UL and DL; 111 means activation of both third secondary UL and DL: 101 means activation of third secondary DL and deactivation of secondary UL: and 100 means deactivation of both third secondary UL and DL.

Alternatively, if (HS-SCCH number) mod 2=0, then the HS-SCCH order may be targeted for second secondary carrier. If (HS-SCCH number) mod 2=1, then the HS-SCCH order may be targeted for first and third carriers. In another variation, if (HS-SCCH number) mod 2=0, then the HS-SCCH order may be targeted for third secondary carrier. If (HS-SCCH number) mod 2=1, then the HS-SCCH order may be targeted for first and second carriers. The orders are accordingly applied to these targeted carriers as shown in the example above.

In another example embodiment, if (HS-SCCI number) mod 2=0, then the HS-SCCH order may be targeted for first and second secondary carrier: 011 means activation of both first secondary UL and DL; 001 means activation of first secondary DL and deactivation of secondary UL; 000 means deactivation of both first secondary UL and DL; 111 means activation of both second secondary UL and DL; 101 means activation of second secondary DL and deactivation of secondary UL; and 100 means deactivation of both second secondary UL and DL. If (HS-SCCH number) mod 2=1, then the HS-SCCH order may be targeted for third secondary carrier—011 means activation of both third secondary UL and DL; 001 means activation of third secondary DL and deactivation of secondary UL; and 000 means deactivation of both third secondary UL and DL.

In another embodiment, if (HS-SCCH number) mod 2=0, then the HS-SCCH order may be targeted for the second and third secondary carrier. If (HS-SCCH number) mod 2=1, then the HS-SCCH order may be targeted for first carriers. Alternatively, if (HS-SCCH number) mod 2=0, then the HS-SCCH order may be targeted for first and third secondary carrier. If (HS-SCCH number) mod 2=1, then the HS-SCCH order may be targeted for second carriers. The orders are accordingly applied to these targeted carriers as shown in the example above.

In another illustrative embodiment, if (HS-SCCH number) mod 2=0, then the HS-SCCH order is targeted for all carriers in the first frequency band configured. Likewise, if (HS-SCCH number) mod 2=1, then the HS-SCCH order is targeted to all carriers in the secondary frequency band configured.

In another embodiment, the carrier or group of carriers for which a deactivation is targeted may be determined based on which carrier the HS-SCCH order was transmitted on. In other words, a deactivation order may be sent over the carrier that is to be deactivated. Activation orders, on the other hand, may be sent on any active carrier. An example realization is shown Table 5, where DLrx and ULrx correspond to the UL and DL carriers associated with the DL carrier over which the HS-SCCH order was received. Table 5 shows an HS-SCCH order for activation/deactivation of the secondary carriers in MC-HSPA.

TABLE 5

4 DL + 4 UL

| Order Type $(x_{odt,1}, x_{odt,2}, x_{odt,3})$ | $x_{ord,1}$ | Order $x_{ord,2}$ | $x_{ord,3}$ | Description of Command |
|---|---|---|---|---|
| 001 | 0 | 0 | 0 | Deactivation of DLrx, Deactivation of ULrx |
| | 0 | 0 | 1 | Activation of DLrx, Deactivation of ULrx |
| | 0 | 1 | 0 | Reserved |
| | 0 | 1 | 1 | Activation of DLrx, Activation of ULrx |
| | 1 | 0 | 0 | Reserved |
| | 1 | 0 | 1 | Activation of DL1 |
| | 1 | 1 | 0 | Activation of DL2 |
| | 1 | 1 | 1 | Activation of DL3 |

Optionally, "100" may be used to deactivate all carriers simultaneously.

In another embodiment, the carrier or group of carriers for which a deactivation is targeted may be determined based on which frequency band the HS-SCCH order was transmitted on. In one example, a deactivation order for all carriers in a given frequency band may be sent over any carrier of the frequency band that is to be deactivated. Activation orders, on the other hand, may be sent on any active carrier.

Disclosed herein are embodiments where new order types are introduced to support activation/deactivation of secondary carriers. In one embodiment, the number of available HS-SCCH orders may be increased by using an additional order type. This allows for the addition of more HS-SCCH orders that may be used in order to activate and deactivate the secondary UL and DL carriers. In one example realization, shown below in Table 6, order type $x_{odt,1}, x_{odt,2}, x_{odt,3}$='001' may be used to send commands to activation and deactivate DL1, DL2, UL1 and UL2, whereas a new order type $x_{odt,1}, x_{odt,2}, x_{odt,3}$='010' may be introduced in order to activate and deactivate DL3 and UL3. Table 6 illustrates an HS-SCCH order for activation/deactivation of the secondary carriers in MC-HSPA.

TABLE 6

4 DL + 4 UL (backward compatible with Release 9 DC-HSUPA)

| Order Type $(x_{odt,1}, x_{odt,2}, x_{odt,3})$ | $x_{ord,1}$ | Order $x_{ord,2}$ | $x_{ord,3}$ | Description Of Command |
|---|---|---|---|---|
| 001 | 0 | 0 | 0 | Deactivation of DL1, Deactivation of UL1 |
| | 0 | 0 | 1 | Activation of DL1, Deactivation of UL1 |
| | 0 | 1 | 0 | Reserved |
| | 0 | 1 | 1 | Activation of DL1, Activation of UL1 |
| | 1 | 0 | 0 | Deactivation of DL2, Deactivation of UL2 |
| | 1 | 0 | 1 | Activation of DL2, Deactivation of UL2 |
| | 1 | 1 | 0 | Reserved |
| | 1 | 1 | 1 | Activation of DL2, Activation of UL2 |
| 010 | 0 | 0 | 0 | Deactivation of DL3, Deactivation of UL3 |
| | 0 | 0 | 1 | Activation of DL3, Deactivation of UL3 |
| | 0 | 1 | 0 | Reserved |
| | 0 | 1 | 1 | Activation of DL3, Activation of UL3 |
| | 1 | 0 | 0 | Reserved |
| | 1 | 0 | 1 | Reserved |
| | 1 | 1 | 0 | Reserved |
| | 1 | 1 | 1 | Reserved |

In another embodiment, the order type that is sent as part of the HS-SCCH order may be used to distinguish amongst carriers. In 3GPP Release 9, order type $x_{odt,1}, x_{odt,2}, x_{odt,3}$='000' may be used to signal commands related to DTX, DRX and HS-SCCH-less operation, whereas order type $x_{odt,1}, x_{odt,2}, x_{odt,3}$='001' may be used to specify activation/deactivation of DL1 and UL1. As part of this embodiment, a new order type may be defined in order to activate and deactivate each additional DL carrier (and possibly each corresponding UL carrier). By way of example, $x_{odt,1}, x_{odt,2}, x_{odt,3}$='010' may be used when signaling activation/deactivation of DL2 and UL2, while $x_{odt,1}, x_{odt,2}, x_{odt,3}$='011' may be used to signal activation/deactivation of DL3 and UL3. It should be understood that any other available order type may be used to signal activation/deactivation of a particular DL and UL pair. The existing order bits, $x_{ord,1}, x_{ord,2}, x_{ord,3}$, as currently defined for 3GPP Release 9, may be reused for each DL and UL carrier pair. The carrier pairs may then be distinguished by order type.

In an alternate embodiment, the number of bits in the HS-SCCH order field may be increased for activation/deactivation of secondary carriers in a MC-HSPA system with 4DL and 4UL carriers. The additional order bit(s), e.g. $x_{ord,4}$, may be taken from any of the six bits in the transport-block size information $(x_{tbspb,1}, x_{tbspb,2}, \ldots, x_{tbspb,6})$ field and/or the one bit new data indicator $(x_{nd,1})$ field. It may be understood that the various activation/deactivation order mapping schemes with three bit order type and three bit order may be used after increasing the length of order and/or order type by any of methods described herein.

In an alternate embodiment, one or two of the HS-SCCH order type bits may be re-interpreted as HS-SCCH order bits. By way of example, the $x_{odt,1}$ bit may be interpreted as $x_{ord,4}$, allowing for more HS-SCCH commands.

In an alternate embodiment, a new HS-SCCH type, for example, type 4, may be introduced to transmit HS-SCCH orders when the WTRU is configured in multi-carrier mode. The WTRU configuration may be signaled from higher layers. HS-SCCH type 4 may be constructed to provide enough order bits for activation/deactivation of secondary carriers in the MC-HSPA system.

Figure 5:
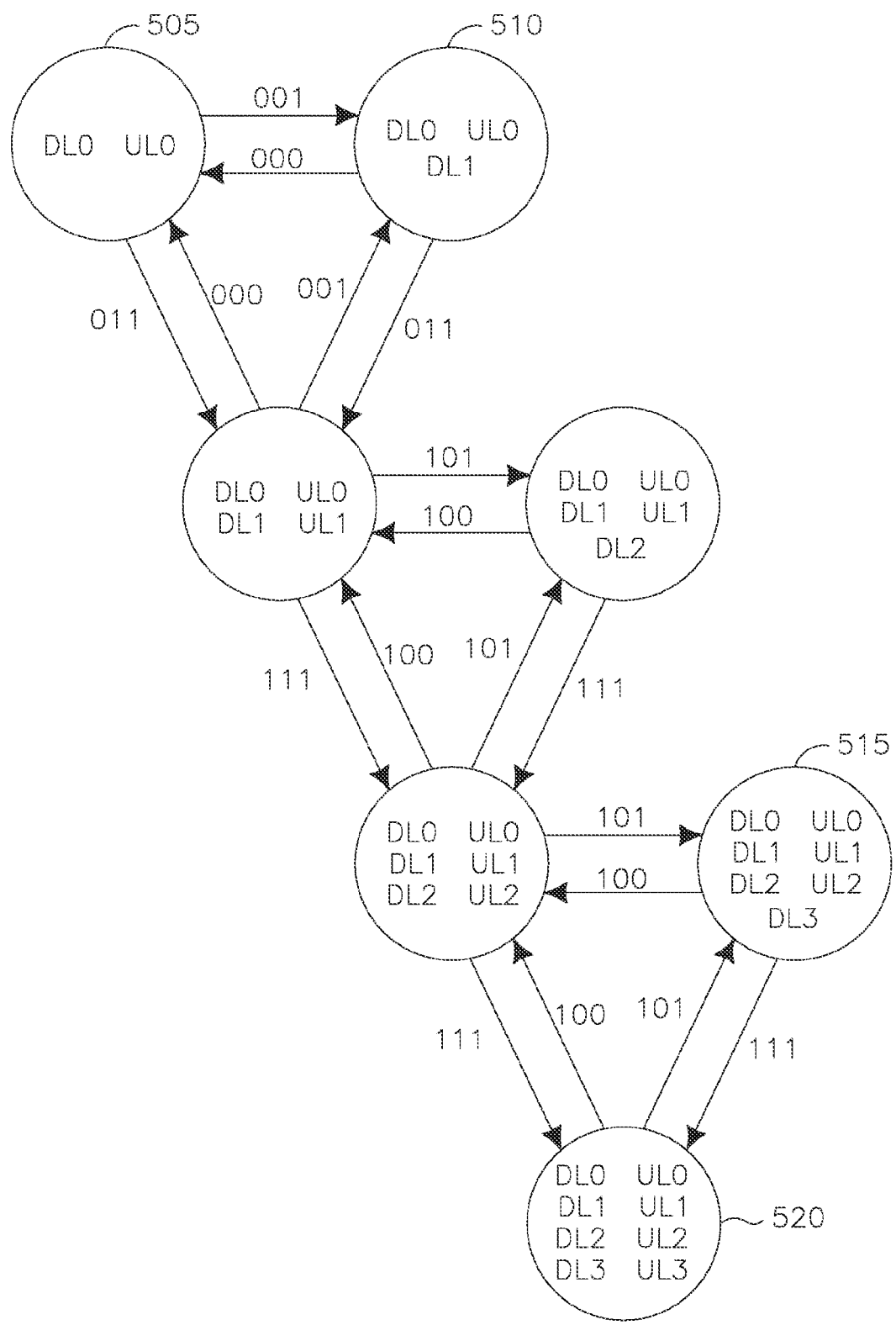
FIG. 5 is an example realization of sequential activation/deactivation of carriers using high-speed shared control channel (HS-SCCH) orders.

In an alternate embodiment, a single set (or a combination of sets) of HS-SCCH orders may be used in sequence in order to activate/deactivate DL and/or UL carriers. An example may be shown with respect to FIG. 5, where a state 505 includes active carriers DL0 and UL0 and a command "001" further activates DL1 in state 510. Moreover, a new set of orders, "101", "111" and "100", may be introduced to activate/deactivate carriers DL2, UL2, DL3 and UL3 in states 515 and 520, respectively. Note that existing 3GPP Release 9 orders "001", "011" and "000" may be used in order to activate/deactivate DL1 and UL1 in this example. Alternatively, "000" may be used in any state in order to return to the base state 505, where all secondary carriers are deactivated.

Methods for activation/deactivation of the secondary carriers implemented on a group basis are now disclosed. In another embodiment, it is proposed that groups of secondary carriers be defined such that single activation/deactivation orders may be applied to the entire group of carriers. The grouping may be determined using any or a combination of the grouping methods disclosed above.

In these methods, the UTRAN may transmit an explicit signal for activation or deactivation of a group of carriers simultaneously such that the control signaling overhead may be decreased. The signaling mechanisms defined above for individual carrier activation/deactivation may be applied to the methods for activation/deactivation of a group of carriers.

In one example method, a new HS-SCCH order type, for example, $(x_{odt,1}, x_{odt,2}, x_{odt,3})$ may be used to signal to the WTRU that the activation/deactivation order may be applied to a particular group of carriers. In this example, order type "010" is used to signal to the WTRU that that the activation/deactivation order may be applied to all carriers defined in group downlink 1 (GDL1) and/or group uplink 1 (GUL1). Table 7 shows an example realization of group-wise activation/deactivation using a new HS-SCCH order type for 4DL+2UL carriers.

TABLE 7

4 DL + 4 UL (backward compatible with Release 9 DC-HSUPA)

| Order Type | Order | | | Description Of Command |
|---|---|---|---|---|
| $(x_{odt,1}, x_{odt,2}, x_{odt,3})$ | $x_{ord,1}$ | $x_{ord,2}$ | $x_{ord,3}$ | |
| 001 | 0 | 0 | 0 | Deactivation of DL1, Deactivation of UL1 |
| | 0 | 0 | 1 | Activation of DL1, Deactivation of UL1 |
| | 0 | 1 | 0 | Reserved |
| | 0 | 1 | 1 | Activation of DL1, Activation of UL1 |

TABLE 7-continued

4 DL + 4 UL (backward compatible with Release 9 DC-HSUPA)

| Order Type | Order | | | Description Of Command |
|---|---|---|---|---|
| $(x_{odt,1}, x_{odt,2}, x_{odt,3})$ | $x_{ord,1}$ | $x_{ord,2}$ | $x_{ord,3}$ | |
| | 1 | 0 | 0 | Deactivate DL2 |
| | 1 | 0 | 1 | Activate DL2 |
| | 1 | 1 | 0 | Deactivate DL3 |
| | 1 | 1 | 1 | Activate DL3 |
| 010 | 0 | 0 | 0 | Deactivate GDL1, Deactivate GUL1 |
| | 0 | 0 | 1 | Activation of GDL1, Deactivation of GUL1 |
| | 0 | 1 | 0 | Reserved |
| | 0 | 1 | 1 | Activation of GDL1, Activation of GUL1 |

In another example method, the group order may be used for the deactivation of carriers and the activation of the carrier(s) may be done through individual orders or a per carrier basis disclosed above. For example, the scope of the existing order type "001" with order bits "000" may be an order for all configured carriers. As such, the transmission of this order by the Node-B may be used to signal the deactivation of all activate DL and UL carriers.

In another embodiment, a single HS-SCCH order may be used to activate and/or deactivate any of all configured secondary UL and DL carriers simultaneously. Each HS-SCCH order represented by the order type in combination with the order bit indicates one state for all configured secondary UL and DL carriers, and the mapping between orders and states may be in any order. Given different carrier configurations such as 4DL+1UL, 4DL+2UL, 4DL+3UL and 4DL+4UL, the total number of resulting activation/deactivation carrier states are respectively 8, 12, 18 and 27. This means that 4DL+1UL carriers may be represented by a three bit order while more than a three bit order may be needed to support configurations with multiple UL carriers such as, but not limited to, 4DL+2DL, 4DL+3UL and 4DL+4UL. Note, the above embodiment assumes that only secondary carriers may be activated/deactivated by HS-SCCH orders. However, activating/deactivating all configured carriers simultaneously may also be applied to the case that the primary DL/UL carriers may be activated/deactivated.

In the single UL carrier configuration, since the three bit order $(x_{ord,1}, x_{ord,2}, x_{ord,3})$ may be available from the currently specified HS-SCCH order, an existing order type $(x_{odt,1}, x_{odt,2}, x_{odt,3})$='001' and the three bit order may be used for activation/deactivation of the secondary carriers. An example is shown in Table 8, where different HS-SCCH orders may be used to indicate explicitly which carriers may be activated and/or which carriers may be deactivated. The advantage of this embodiment over the previous one in Table 1 is that a single order may be used to activate/deactivate multiple carriers simultaneously. It should be understood that the actual command-to-bit mapping may take a different form than that shown in Table 8. Moreover, it should also be understood that the actual combination of carrier configurations defined for each command may take a different form.

TABLE 8

4 DL + 1 UL

| Order Type | Order | | | Resulting Carrier Configuration | Description of Command |
|---|---|---|---|---|---|
| $(x_{odt,1}, x_{odt,2}, x_{odt,3})$ | $x_{ord,1}$ | $x_{ord,2}$ | $x_{ord,3}$ | | |
| 001 | 0 | 0 | 0 | UL0; DL0 | Deactivate DL1, DL2, DL3 |
| | 0 | 0 | 1 | UL0; DL0, DL1 | Deactivate DL2, DL3; Activate DL1 |
| | 0 | 1 | 0 | UL0; DL0, DL2 | Deactivate DL1, DL3; Activate DL2 |
| | 0 | 1 | 1 | UL0; DL0, DL3 | Deactivate DL1, DL2; Activate DL3 |

TABLE 8-continued

| | | | 4 DL + 1 UL | |
|---|---|---|---|---|
| Order Type | | Order | | Resulting Carrier |
| $(x_{odt,1}, x_{odt,2}, x_{odt,3})$ | $x_{ord,1}$ | $x_{ord,2}$ | $x_{ord,3}$ Configuration | Description of Command |
| | 1 | 0 | 0  UL0; DL0, DL1, DL2 | Deactivate DL3; Activate DL1, DL2 |
| | 1 | 0 | 1  UL0; DL0, DL1, DL3 | Deactivate DL2; Activate DL1, DL3 |
| | 1 | 1 | 0  UL0; DL0, DL2, DL3 | Deactivate DL1; Activate DL2, DL3 |
| | 1 | 1 | 1  UL0; DL0, DL1, DL2, DL3 | Activate DL1, Dl2, DL3 |

In the multiple UL carrier configuration case, the existing order type and 3 bit order may not be enough to map the resulting activation/deactivation carrier states. This may be overcome using one or any combination of the following methods.

In a first method, a new order type is defined for MC-HSPA. There is 3 bit order type $(x_{odt,1}, x_{odt,2}, x_{odt,3})$ in the current HS-SCCH order physical channel, which may represent 8 order types. In Release 9 DC-HSUPA, order type $x_{odt,1}$, $x_{odt,2}$, $x_{odt,3}$='000' and part of order type $x_{odt,1}$, $x_{odt,2}$, $x_{odt,3}$='001' are used. New order types may be defined such that more commands may be available to map all resulting activation/deactivation carrier states in MC-HSPA having more than one configured UL carrier.

For example, to support 4DL and 4UL carriers, 27 resulting carrier configuration states may be needed to be commanded by the combination of order type and order bits. A three bit order type $(x_{odt,1}, x_{odt,2}, x_{odt,3})$, which provides seven order types, in combination with a three bit order $(x_{ord,1}, x_{ord,2}, x_{ord,3})$ may create sufficient orders. Table 9 illustrates one example of mapping between reserved (available) commands and all resulting carrier configurations states for a MC-HSPA system having 4DL and 4UL carriers. It should be understood that the actual command-to-bit mapping may take a different form than that shown in Table 9. Moreover, it should also be understood that the actual combination of carriers defined for each command may take a different form.

TABLE 9

| | | | 4 DL + 4 UL | |
|---|---|---|---|---|
| Order Type | | Order | | |
| $(x_{odt,1}, x_{odt,2}, x_{odt,3})$ | $x_{ord,1}$ | $x_{ord,2}$ | $x_{ord,3}$ Resulting Carrier Configuration | Description of Command |
| 001 | 0 | 0 | 0  UL0; DL0 | Deactivate DL1, DL2, DL3, UL1, UL2, UL3 |
| | 0 | 0 | 1  UL0; DL0, DL1 | Deactivate DL2, DL3, UL1, UL2, UL3 Activate DL1 |
| | 0 | 1 | 0  Reserved | Reserved |
| | 0 | 1 | 1  UL0, UL1; DL0, DL1 | Deactivate DL2, DL3, UL2, UL3 Activate DL1, UL1 |
| | 1 | 0 | 0  UL0; DL0, DL2 | Deactivate DL1, DL3, UL1, UL2, UL3 Activate DL2 |
| | 1 | 0 | 1  UL0; DL0, DL3 | Deactivate DL1, DL2, UL1, UL2, UL3 Activate DL3 |
| | 1 | 1 | 0  UL0; DL0, DL1, DL2 | Deactivate DL3, UL1, UL2, UL3 Activate DL1, DL2 |
| | 1 | 1 | 1  UL0; DL0, DL1, DL3 | Deactivate DL2, UL1, UL2, UL3 Activate DL1, DL3 |
| 010 | 0 | 0 | 0  UL0; DL0, DL2, DL3 | Deactivate DL1, UL1, UL2, UL3 Activate DL2, DL3 |
| | 0 | 0 | 1  UL0; DL0, DL1, DL2, DL3 | Deactivate UL1, UL2, UL3 Activate DL1, DL2, DL3 |
| | 0 | 1 | 0  UL0, UL1; DL0, DL1, DL2 | Deactivate DL3, UL2, UL3 Activate DL1, DL2, UL1 |
| | 0 | 1 | 1  UL0, UL1; DL0, DL1, DL3 | Deactivate DL2, UL2, UL3 Activate DL1, DL3, UL1 |
| | 1 | 0 | 0  UL0, UL1; DL0, DL1, DL2, DL3 | Deactivate UL2, UL3 Activate DL1, DL2, DL3, UL1 |
| | 1 | 0 | 1  UL0, UL1, UL2; DL0, DL1, DL2 | Deactivate DL3, UL3 Activate DL1, DL2, UL1, UL2 |
| | 1 | 1 | 0  UL0, UL1, UL2; DL0, DL1, DL2, DL3 | Deactivate UL3 Activate DL1, DL2, DL3, UL1, UL2 |
| | 1 | 1 | 1  UL0, UL1, UL2, UL3; DL0, DL1, DL2, DL3 | Activate DL1, DL2, DL3, UL1, UL2, UL3 |
| 011 | 0 | 0 | 0  UL0, UL2; DL0, DL2, | Deactivate DL1, DL3, UL1, UL3 Activate DL2, UL2 |
| | 0 | 0 | 1  UL0, UL2; DL0, DL1, DL2 | Deactivate DL3, UL1, UL3 Activate DL1, DL2, UL2 |
| | 0 | 1 | 0  UL0, UL2; DL0, DL2, DL3 | Deactivate DL1, UL1, UL3 Activate DL2, DL3, UL2 |
| | 0 | 1 | 1  UL0, UL2; DL0, DL1, DL2, DL3 | Deactivate UL1, UL3 Activate DL1, DL2, DL3, UL2 |
| | 1 | 0 | 0  UL0, UL3; DL0, DL3 | Deactivate DL1, DL2, UL1, UL2 Activate DL3, UL3 |

TABLE 9-continued

4 DL + 4 UL

| Order Type | Order | | | | |
|---|---|---|---|---|---|
| ($x_{odt,1}$, $x_{odt,2}$, $x_{odt,3}$) | $x_{ord,1}$ | $x_{ord,2}$ | $x_{ord,3}$ | Resulting Carrier Configuration | Description of Command |
| | 1 | 0 | 1 | UL0, UL3; DL0, DL1, DL3 | Deactivate DL2, UL1, UL2 Activate DL1, DL3, UL3 |
| | 1 | 1 | 0 | UL0, UL3; DL0, DL2, DL3 | Deactivate DL1, UL1, UL2 Activate DL2, DL3, UL3 |
| | 1 | 1 | 1 | UL0, UL3; DL0, DL1, DL2, DL3 | Deactivate UL1, UL2 Activate DL1, DL2, DL3, UL3 |
| 100 | 0 | 0 | 0 | UL0, UL2, UL3; DL0, DL2, DL3 | Deactivate DL1, UL1 Activate DL2, DL3, U2, UL3 |
| | 0 | 0 | 1 | UL0, UL2, UL3; DL0, DL1, DL2, DL3 | Deactivate UL1 Activate DL1, DL2, DL3, U2, UL3 |
| | 0 | 1 | 0 | UL0, UL1, UL3; DL0, DL1, DL3 | Deactivate DL2, UL2 Activate DL1, DL3, UL1, UL3 |
| | 0 | 1 | 1 | UL0, UL1, UL3; DL0, DL1, DL2, DL3 | Deactivate UL2 Activate DL1, DL2, DL3, UL1, UL3 |
| | 1 | 0 | 0 | Reserved | Reserved |
| | 1 | 0 | 1 | Reserved | Reserved |
| | 1 | 1 | 0 | Reserved | Reserved |
| | 1 | 1 | 1 | Reserved | Reserved |

In a second method, the length of the order may be increased. This may be achieved by re-interpreting order type as order bits. This will increase the length of the order bits from three bits to six bits, where there are three bits from the order type plus three bits from the order) bit. This may fully support 4DL+4UL carriers. Depending on whether backward compatibility is kept with Release 9 DC-HSUPA, order type $x_{odt,1}$, $x_{odt,2}$, $x_{odt,3}$='000' in combination with a three bit order may or may not be used for activation and deactivation of secondary carriers of MC-HSPA. As noted previously, these were used for activation/deactivation of DTX, DRX and HS-SCCH-less operation and for HS-DSCH serving cell change in Release 9.

In an alternative method, a reserved new data indicator combined to a part of Transport-block size information may be re-interpreted as an order type and/or order. As no HS-PDSCH is associated with HS-SCCH orders, a part of the six bit transport-block size information ($x_{tbspb,1}$, $x_{tbspb,2}$, . . . , $x_{tbspb,6}$) and/or the one bit new data indicator ($x_{nd,1}$) may be used or reinterpreted to increase the length of the order. For example, ($x_{tbspb,5}$, $x_{tbspb,6}$) and $x_{nd,1}$ may be used to increase the length of order for HS-SCCH type 1. By way of example, if $x_{nd,1}$ is used, then $x_{nd,1}$ may be set to $x_{ord,4}$ for the HS-SCCH order (HS-SCCH type1). By way of another example, if ($x_{tbspb,4}$, $x_{tbspb,5}$, $x_{tbspb,6}$) are used, then the HS-SCCH order (HS-SCCHI type3) may be: $x_{tbspb,1}$, $x_{tbspb,2}$, . . . , $x_{tbspb,6}$ and set to '1, 1, 1, $x_{ord,4}$, $x_{ord,5}$, $x_{ord,6}$'. It may be understood that the re-interpreted bit may be mapped to any bit of order type or order.

In an alternate embodiment, a new HS-SCCH type, such as for example, type 4, may be introduced to transmit HS-SCCH orders when the WTRU is configured for multi-carrier operations, or multi-carrier (MC) mode. This MC mode status may be signaled explicitly from higher layers (e.g., via RRC signaling). The HS-SCCH type 4 may be constructed to provide enough order bits for activation/deactivation of secondary carriers in a MC-HSPA system.

Disclosed herein are methods for signaling multiple HS-SCCH orders for MC-HSPA. As a HS-SCCH order may be transmitted on any carrier, multiple serving cells may signal multiple HS-SCCH orders for activation/deactivation for the secondary carriers in MC-HSPA, for example with 4DL and 4UL carriers, on a per-carrier (or individual or per-paired-carrier which may be pre-defined or pre-specified or pre-configured) basis or a group basis. Different orders may have different order type and order. This method may be applied to MC-HSPA with more than 4DL and 4UL carriers at the cost of control signaling overhead.

In another embodiment, the UTRAN transmits an explicit L1 signal for activation or deactivation of each carrier or independently.

In a first method, the L1 signal comprises a HS-SCCH order that may carry the activation/deactivation command for multiple carriers. This may be implemented for example by mapping some or all of the HS-SCCH order type bits to a given carrier. The mapping may be configured by the network or may be implicit. Alternatively, this HS-SCCH order may carry only a single activation/deactivation command in combination to a target carrier address. For example, this may be implemented by reserving 2 bits of the HS-SCCH order type to indicate one of 4 carriers and the other bit to indicate carrier activation or deactivation.

In a second method, the L1 signal comprises an enhanced dedicated channel (E-DCH) Absolute Grant Channel (E-AGCH) with the bit-fields re-interpreted to signal simultaneous activation/deactivation of multiple carriers. In a third method, L2 or L3 messages are used to carry the activation and deactivation explicit command.

In another embodiment, carrier activation or deactivation is triggered by implicit rules at the WTRU. The triggers may be based on any of the following parameters, individually or in any combination. For example, the parameter may be a buffer status such as the total E-DCH buffer status (TEBS). It may be the received transport block size on the anchor cell, the power headroom as indicated by in the scheduling information (SI) or the received signal power as indicated or represented by the received signal code power (RSCP), received signal strength indicator (RSSI) or other similar measures.

The network may configure different thresholds for these triggers for carrier activation and deactivation. Once a carrier activation or deactivation is triggered, the WTRU may perform any of the following steps individually or in any combination and order.

The WTRU may signal, using L1, L2 or L3, the carrier activation or deactivation indication message to the network. The WTRU may include the measurement and/or the cause that triggered the carrier activation/deactivation as part of the indication message. The WTRU may also include an index to a carrier to activate/deactivate as part of the indication message.

The WTRU may wait for an explicit activation or deactivation command from the network. In one method, if the indication is a deactivation, the WTRU may autonomously deactivate the carrier. In another method, if the indication is carrier activation, the WTRU may autonomously activate the carrier.

Upon deactivation of a supplementary carrier, channel quality indicator (CQI) feedback reporting for that supplementary carrier may be halted. Alternatively, the CQI feedback reporting may be transmitted at a lower rate. In another alternative, the CQI feedback reporting may be transmitted at a slower rate using L2 signaling, for example, in the medium access channel (MAC) MAC-i header, or L3 signaling, instead of using the L1 high-speed dedicated physical control channel (HS-DPCCH). Upon activation of a supplementary carrier, the CQI feedback may be resumed. These CQI actions are applicable to all embodiments disclosed herein.

When multiple carriers are configured in a same frequency band for multi-carrier operation, the carriers may be adjacent or non-adjacent. Adjacent carriers may be spaced by the bandwidth required for a particular technology. For example, in WCDMA FDD, each carrier may be spaced 5 MHz. Therefore, the carrier frequency of the adjacent carriers is spaced by 5 MHz. In general, when N adjacent carriers are configured, the adjacent carriers occupy an aggregate and continuous bandwidth of N times 5 MHz.

Due to hardware limitations, it may be difficult for some WTRUs to simultaneously receive and successfully demodulate signals from non-adjacent carriers in the same frequency band. The hardware limitations may include limitations with respect to filtering the signals. For multi-carrier operation, when there are more than two carriers, the carrier activation/deactivation status for a WTRU may need to be restricted in order to maintain or ensure a continuous activated spectrum.

When having non-adjacent carriers within one frequency band is not supported by the WTRU, the RRC may not allow for the configuration of non-adjacent carriers within the frequency band. Similarly, the Node-B may not be configured or allowed to use HS-SCCH orders that may result in the non-adjacent carriers arising from the deactivation of one or more configured carriers.

The HS-SCCH order schemes described herein consider both non-adjacent and adjacent carriers scenarios. The methods disclosed herein may also be used for the activation and deactivation of multiple carriers with the restriction of having only adjacent carriers activated. This may be done by reserving any HS-SCCH order that results in non-adjacent carriers (i.e., these HS-SCCH orders may not be used or signaled by the Node-B). For example, in MC-HSDPA with 4DL and 1UL carrier case, if 4DL adjacent carriers are configured by assuming they are adjacent in the order DL0, DL1, DL2 and DL3 without the loss of generality, then the order "0xx" ("x" can be 0 or 1) in Table 1 may be reserved as only DL3 can be activated/deactivated when assuming DL0/UL0 may not be deactivated. Similarly, the methods used for designing HS-SCCH orders for carrier activation/deactivation disclosed herein may be used for further optimizing the activation/deactivation of carriers with the adjacent carrier restriction described above.

Further, methods describing WTRU behavior upon reception of a configuration message leading to an unsupported carrier activation/deactivation configuration are disclosed herein. In one example, the WTRU receives an HS-SCCH order causing an invalid carrier activation/deactivation configuration. The WTRU may perform any one or a combination of the following actions when receiving an HS-SCCH order causing an invalid carrier activation/deactivation configuration: the WTRU may ignore the HS-SCCH order and maintain its current configuration; the WTRU may ignore the HS-SCCH order and disable all supplementary carriers in the frequency band with non-adjacent carriers; the WTRU may the HS-SCCH order on the HS-DPCCH; the WTRU may acknowledge the HS-SCCH order on the HS-DPCCH; the WTRU may negative-acknowledge the HS-SCCH order on the HS-DPCCH; or the WTRU does not acknowledge or negative-acknowledge the HS-SCCH order on the HS-DPCCH (DTX).

Disclosed herein are embodiments for activating/deactivating DRX and DTX and processing DRX and DTX operations. Methods to configure a WTRU for DRX operations are described below. The WTRU may configured by the network using L3 messaging.

In a first embodiment, the network configures the WTRU with one set of DRX parameters and the WTRU applies these DRX parameters implicitly for all downlink carriers. In another embodiment, the network configures one set of DRX parameters per frequency band and the WTRU applies the same parameters to all downlink carriers in the same frequency band. In yet another embodiment, the network configures one set of DRX parameters for each carrier separately. In a further embodiment, the network configures one set of DRX parameters for each anchor carrier. In this embodiment, the DRX parameters for supplementary carriers are the same as those for the associated anchor carrier. In the embodiments disclosed herein, a second set may be configured by the network if the WTRU has more than one receiver chain.

In still another embodiment, the network configures one set of DRX parameters per group of downlink carriers, where all carriers within the same group use the same DRX parameters. The groups may be pre-configured through radio resource control (RRC) signaling upon radio bearer establishment/reconfiguration or pre-configured at the WTRU. Alternatively, a group of downlink carriers may be defined as all of those carriers for which the WTRU is allocated the same radio network temporary identifier. The Grouping methods disclosed earlier may be used to determine the appropriate groups.

Embodiments related to DRX status upon initialization is disclosed herein. In one embodiment, the DRX for all downlink carriers may be deactivated when configuring the downlink carriers. Alternatively, the network may pre-configure the DRX status, which may be applied to all or only a subset or group of the downlink carriers. In another alternative, the network may configure the DRX status to each downlink carrier individually.

Embodiments for triggering DRX activation and deactivation at the WTRU are disclosed herein. In one embodiment, the network may explicitly signal the WTRU to activate or deactivate DRX. This activation or deactivation message may be directed at one particular carrier, or to a group of carriers. To explicitly signal DRX activation and deactivation, the network may use any of the approaches described above for carrier activation and deactivation by replacing carrier activation/deactivation by DRX activation/deactivation.

In another embodiment, the WTRU may implicitly activate or deactivate DRX for a subset or groups of carriers. The activation or deactivation triggers may be based for example on any one or a combination of the following measurements. One measurement may be the downlink activity over a given period of time. Another measurement may be the downlink data rate over a given period of time. Still another measurement may be the reported CQI. Yet other measurements may be the radio power measurements such as common pilot channel (CPICH) measurements, RSCP, RSSI, etc. These measurements may be performed on one or over several carriers, and may be averaged.

The network may configure a threshold to go into DRX (DRX-in) and a threshold to get out of DRX (DRX-out) based on one or more of the above measurements. When DRX is not active and the actual measurement reaches the DRX-in threshold, the WTRU may apply DRX on the associated carrier or group of carriers. Likewise, when DRX is activated and the actual measurement reaches the DRX-out threshold, the WTRU may deactivate DRX on the associated carrier or group of carriers.

For implicit activation and deactivation of DRX, the WTRU may signal a change of status to the network. Thus, when DRX is activated, the WTRU may send a message to inform the network of a change of status. This message may include any one or a combination of the following information: the related carrier index or reference; the measurement value that triggered the change of status; the cause of change; an activation time; or the new status.

Disclosed herein are WTRU actions relative to DRX operations upon carrier activation. Once the WTRU activates one or more carriers, the WTRU may perform any one or a combination of the following actions. In one method, the WTRU may resume the DRX status of the carrier to the state it was in before deactivation. In another method, the WTRU may configure the DRX status of the carrier to same status as the anchor carrier. In yet another method, the WTRU may configure the DRX status of the carrier to the same status as the anchor carrier in the same frequency band. In still another method, the WTRU may configure the DRX status of the carrier to the same status as the other carriers in the same frequency band. In a further method, the WTRU may configure the DRX status to "active". In yet a further method, the WTRU may configure the DRX status to "inactive". In another method, the WTRU may deactivate DRX for all carriers. In still another method, the WTRU may deactivate DRX for all carriers in the same band as the newly activated carrier. In yet another method, the WTRU may activate DRX for all carriers. In a further method, the WTRU may deactivate DRX for all carriers in the same frequency band as the newly activated carrier.

Disclosed herein are WTRU actions relative to DRX operations upon carrier deactivation. Once the WTRU deactivates one or more carriers, the WTRU may perform any one or a combination of the following actions. In one method, the WTRU may activate DRX for all or a group of remaining active carriers. For example, the WTRU interprets carrier deactivation as a low-activity state transition or as going into a lower power mode. In another method, the WTRU may deactivate DRX for all or a group of remaining active carriers. For example, the WTRU may interpret carrier deactivation as a means to save power without a change of traffic activity.

Disclosed herein are embodiments for processing acknowledgement and negative acknowledgement (ACK/NACK) feedback in HSDPA in multiple carrier scenarios. In current systems, acknowledgement and negative acknowledgement (ACK/NACK) feedback in HSDPA with multiple-in and multiple-out (MIMO) or DC-HSDPA may consist of transmitting a pre-defined signature on a hybrid automatic repeat request (HARQ) HARQ-ACK field of the HS-DPCCH. In this method, there is one signature per possible combination of ACK/NACK/DTX events.

Figure 6:
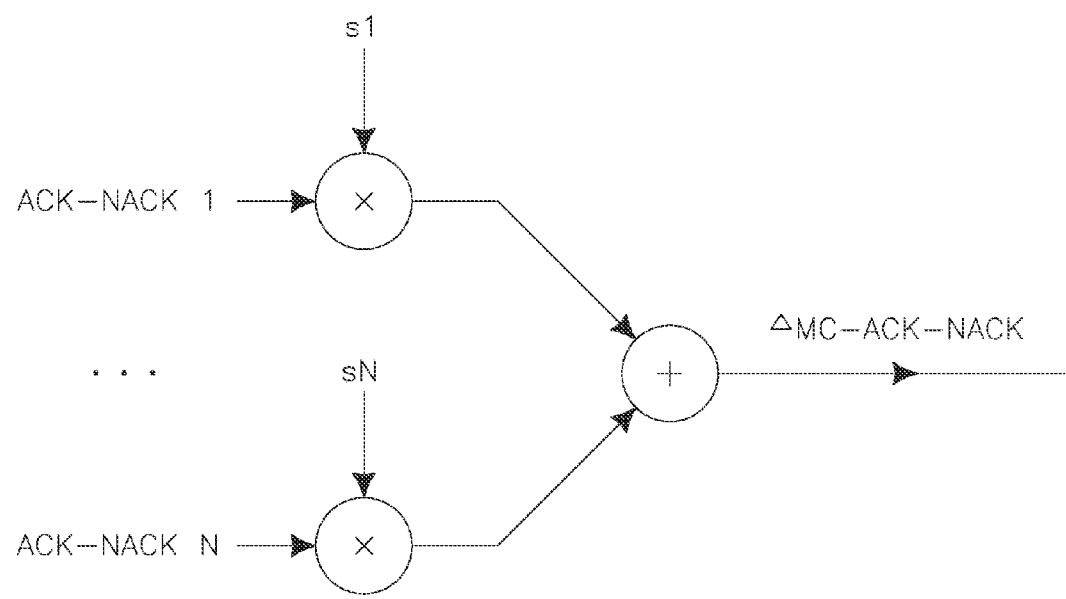
FIG. 6 shows an example embodiment of transmitting acknowledgement/negative acknowledgement (ACK/NACK) information using a superposition of modulated signatures.

In an embodiment, the ACK/NACK information is transmitted by using a superposition of modulated signatures as illustrated in FIG. 6. There may be one signature per configured carrier. The N signatures may be orthogonal. The ACK-NACK x inputs may take values +1, −1 and 0 to represent ACK, NACK and DTX, respectively. Alternatively, the values of ACK and NACK may be inverted. In another alternative, the amplitude of the ACK and NACK may be configured to different values than unity. This configuration may also be signaled by the UTRAN.

The result from the summation of all transmitted signature may be scaled by a factor $\Delta_{MC\text{-}ACK\text{-}NACK}$. This factor may be predefined or configured by the UTRAN. Alternatively, this scaling factor may depend upon the number of ACK/NACK transmitted. More power may be allocated to the ACK/NACK when more signatures are present simultaneously to compensate for the potential additional distortion induced in the signal.

In an alternative embodiment, the value of the $\Delta_{MC\text{-}ACK\text{-}NACK}$ scaling factor may be determined by pre-defined rules based on the number of non-zero ACK-NACK values transmitted. Nnz. For example, for each additional non-zero ACK-NACK transmitted, an additional $\Delta$nz (in dB) is added to the scaling factor, where $\Delta$nz is signaled by the UTRAN or preconfigured in the specifications.

In a second alternative embodiment, a lookup table mapping the scaling factor to the number of non-zero ACK-NACKs may be pre-defined or signaled by the UTRAN.

Although the embodiments disclosed herein for multiple carrier activation/deactivation and operations are described with respect to multiple carrier high speed packet access (HSPA) and high speed downlink packet access (HSDPA), the embodiments are applicable to systems beyond these carrier configurations and to other multiple carrier systems.

Figure 7:
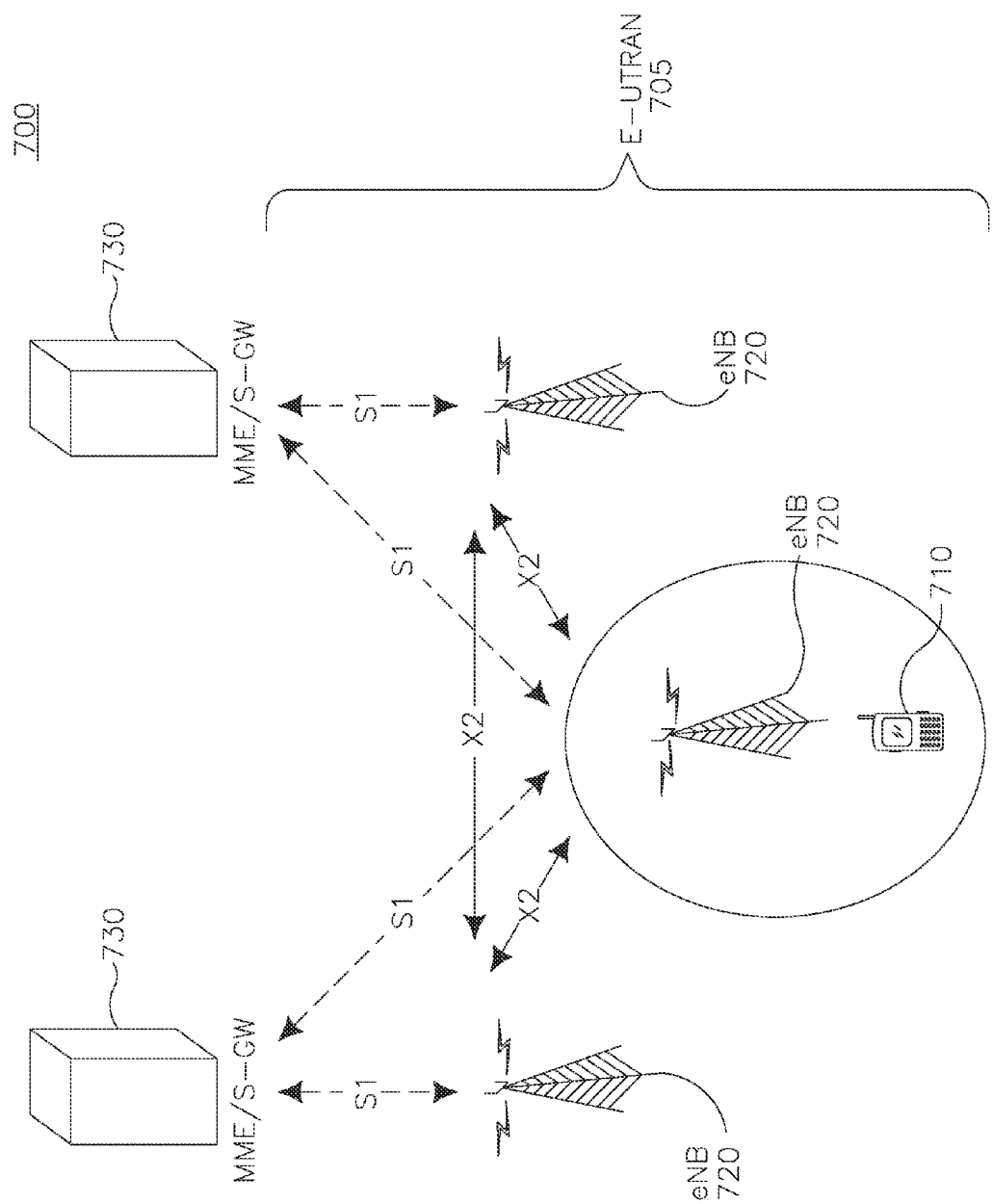
FIG. 7 is an embodiment of a wireless communication system/access network of long term evolution (LTE)

Although the above is disclosed with respect to HSPA and HSDPA, it is applicable to any wireless environment. For example, FIG. 7 shows a Long Term Evolution (LTE) wireless communication system/access network 700 that includes an Evolved-Universal Terrestrial Radio Access Network (E-UTRAN) 705. The E-UTRAN 705 includes a WTRU 710 and several evolved Node-Bs, (eNBs) 720. The WTRU 710 is in communication with an eNB 720. The eNBs 720 interface with each other using an X2 interface. Each of the eNBs 720 interface with a Mobility Management Entity (MME)/Serving GateWay (S-GW) 730 through an S1 interface. Although a single WTRU 710 and three eNBs 720 are shown in FIG. 7, it should be apparent that any combination of wireless and wired devices may be included in the wireless communication system access network 700.

Figure 8:
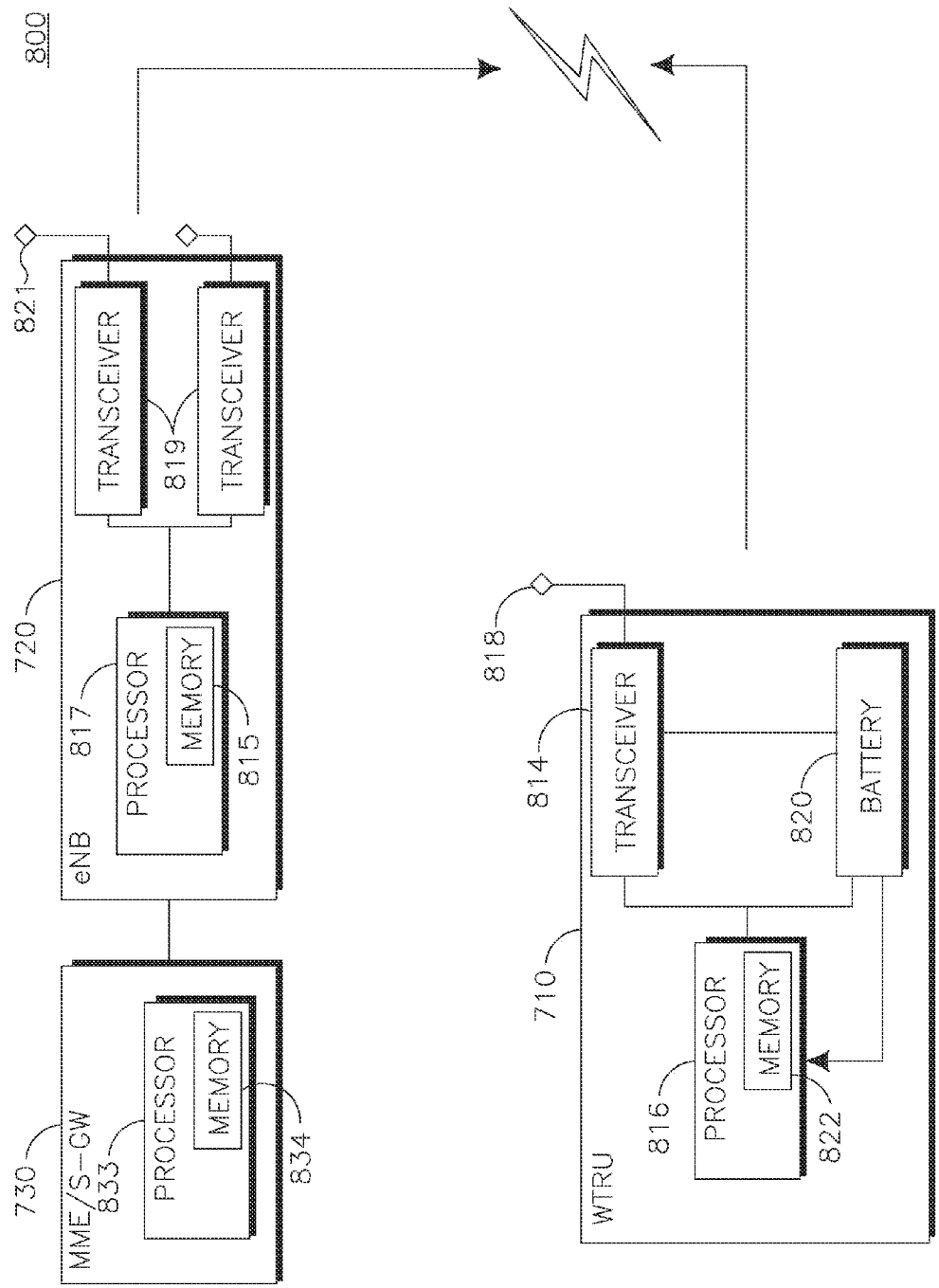
FIG. 8 are example block diagrams of a WTRU and a Node-B of the LTE wireless communication system.

FIG. 8 is an example block diagram of an LTE wireless communication system 700 including the WTRU 710, the eNB 720, and the MME/S-GW 730. As shown in FIG. 8, the WTRU 710, the eNB 720 and the MME/S-GW 730 are configured to enhance direct link communication security.

In addition to the components that may be found in a typical WTRU, the WTRU 710 includes a processor 816 with an optional linked memory 822, at least one transceiver 814, an optional battery 820, and an antenna 818. The processor 816 is configured to enhance direct link communication security. The transceiver 814 is in communication with the processor 816 and the antenna 818 to facilitate the transmission and reception of wireless communications. In case a battery 820 is used in the WTRU 710, it powers the transceiver 814 and the processor 816.

In addition to the components that may be found in a typical eNB, the eNB 720 includes a processor 817 with an optional linked memory 815, transceivers 819, and antennas 821. The processor 817 is configured to enhance direct link communication security. The transceivers 819 are in communication with the processor 817 and antennas 821 to facilitate the transmission and reception of wireless communications. The eNB 720 is connected to the Mobility Management Entity/Serving GateWay (MME/S-GW) 730 which includes a processor 833 with an optional linked memory 834.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for activating/deactivating multiple secondary carriers, the method comprising:
   receiving a first order comprising a first combination of three order type bits and a first combination of three order bits, wherein the first combination of three order type bits and the first combination of three order bits provide activation/deactivation information relating to a first plurality of secondary carriers;
   determining from the first order one of the following: at least one secondary carrier to activate and at least one secondary carrier to deactivate, a plurality of secondary carriers to activate, or a plurality of secondary carriers to deactivate; and
   performing activation/deactivation of the first plurality of secondary carriers based on the determination.

2. The method of claim 1, wherein the first combination of three order type bits is capable of use with a two carrier configuration and a four carrier configuration.

3. The method of claim 1, wherein the first plurality of secondary carriers comprises three secondary downlink carriers.

4. The method of claim 1, wherein first plurality of secondary carriers comprises at least three secondary downlink carriers and at least one secondary uplink carrier.

5. The method of claim 1, further comprising:
   receiving a second order comprising a second combination of three order type bits and a second combination of three order bits, wherein the second combination of three order type bits and the second combination of three order bits provide activation/deactivation information relating to a second plurality of secondary carriers; and
   determining from the second order one of the following: at least one secondary carrier to activate and at least one secondary carrier to deactivate, a plurality of secondary carriers to activate, or a plurality of secondary carriers to deactivate.

6. A wireless transmit/receive unit (WTRU) comprising:
   a processor configured to:
      receive a first order comprising a first combination of three order type bits and a first combination of three order bits, wherein the first combination of three order type bits and the first combination of three order bits provide activation/deactivation information relating to a first plurality of secondary carriers;
      determine from the first order one of the following: at least one secondary carrier to activate and at least one secondary carrier to deactivate, a plurality of secondary carriers to activate, or a plurality of secondary carriers to deactivate; and
      perform activation/deactivation on the first plurality of secondary carriers based on the determination.

7. The WTRU of claim 6, wherein the first combination of three order type bits is capable of use with a two carrier configuration and a four carrier configuration.

8. The WTRU of claim 6, wherein the first plurality of secondary carriers comprises three secondary downlink carriers.

9. The WTRU of claim 6, wherein the first plurality of secondary carriers comprises at least three secondary downlink carriers and at least one secondary uplink carrier.

10. The WTRU of claim 6, wherein the processor is further configured to:
    receive a second order comprising a second combination of three order type bits and a second combination of three order bits, wherein the second combination of three order type bits and the second combination of three order bits provide activation/deactivation information relating to a second plurality of secondary carriers; and
    determine from the second order one of the following: at least one secondary carrier to activate and at least one secondary carrier to deactivate, a plurality of secondary carriers to activate, or a plurality of secondary carriers to deactivate.

11. The method of claim 5, wherein the first plurality of secondary carriers and the second plurality of secondary carrier are the same.

12. The method of claim 1, wherein the first plurality of secondary carriers comprises at least four secondary carriers.

13. The method of claim 1, wherein the first plurality of secondary carriers comprises at least one downlink secondary carrier and at least one uplink secondary carrier, and wherein the at least one downlink secondary carrier is a secondary serving HS-DSCH cell and the at least one uplink secondary carrier is a secondary uplink frequency.

14. The WTRU of claim 10, wherein the first plurality of secondary carriers and the second plurality of secondary carrier are the same.

15. The WTRU of claim 6, wherein the first plurality of secondary carriers comprises at least four secondary carriers.

16. The WTRU of claim 6, wherein the first plurality of secondary carriers comprises at least one downlink secondary carrier and at least one uplink secondary carrier, and wherein the at least one downlink secondary carrier is a secondary serving HS-DSCH cell and the at least one uplink secondary carrier is a secondary uplink frequency.

* * * * *